US009417921B2

(12) United States Patent
Galdy et al.

(10) Patent No.: US 9,417,921 B2
(45) Date of Patent: Aug. 16, 2016

(54) METHOD AND SYSTEM FOR A GRAPH BASED VIDEO STREAMING PLATFORM

(71) Applicant: iStreamPlanet Co., Las Vegas, NV (US)

(72) Inventors: Alessio Galdy, Seattle, WA (US); Sidharth Sapru, Redmond, WA (US)

(73) Assignee: iStreamPlanet Co., Las Vegas, NV (US)

( * ) Notice: Subject to any disclaimer, the term of this patent is extended or adjusted under 35 U.S.C. 154(b) by 0 days.

(21) Appl. No.: 14/448,915

(22) Filed: Jul. 31, 2014

(65) Prior Publication Data

US 2016/0034306 A1 Feb. 4, 2016

(51) Int. Cl.
*G06F 9/46* (2006.01)
*G06F 9/50* (2006.01)
*G06F 9/48* (2006.01)

(52) U.S. Cl.
CPC ............ *G06F 9/5011* (2013.01); *G06F 9/4881* (2013.01)

(58) Field of Classification Search
CPC G06F 9/5011; G06F 17/30017; G06F 9/4881
USPC ..................................... 718/1, 101–107, 108
See application file for complete search history.

(56) References Cited

U.S. PATENT DOCUMENTS

| 5,742,821 | A | * | 4/1998 | Prasanna | .................. | G06F 8/451 |
| | | | | | | 718/102 |
| 5,913,038 | A | * | 6/1999 | Griffiths | .................. | H04N 19/00 |
| | | | | | | 348/E5.002 |
| 6,110,220 | A | * | 8/2000 | Dave | ...................... | G06F 9/4887 |
| | | | | | | 716/105 |
| 6,195,680 | B1 | | 2/2001 | Goldszmidt et al. | | |
| 6,407,680 | B1 | | 6/2002 | Lai et al. | | |
| 6,571,282 | B1 | | 5/2003 | Bowman-Amuah | | |
| 6,769,127 | B1 | | 7/2004 | Bonomi et al. | | |
| 7,080,153 | B2 | | 7/2006 | Monteiro et al. | | |
| 7,325,232 | B2 | * | 1/2008 | Liem | .................... | G06F 17/5045 |
| | | | | | | 709/223 |
| 7,761,591 | B2 | | 7/2010 | Graham | | |
| 7,925,781 | B1 | | 4/2011 | Chan et al. | | |
| 8,010,830 | B2 | | 8/2011 | Hotta et al. | | |
| 8,015,564 | B1 | * | 9/2011 | Beyer | ...................... | G06F 9/505 |
| | | | | | | 718/100 |
| 8,059,662 | B2 | | 11/2011 | Moote et al. | | |
| 8,135,413 | B2 | | 3/2012 | Dupray | | |

(Continued)

OTHER PUBLICATIONS

Liang et al, "Cross-Tree Adjustment for Spatialized Audio Streaming over Networked Virtual Environments", ACM, pp. 73-78, 2003.*

(Continued)

*Primary Examiner* — Anil Khatri
(74) *Attorney, Agent, or Firm* — Nicholson De Vos Webster & Elliott, LLP

(57) ABSTRACT

A method implemented in an electronic device serving as an orchestrator managing video and audio stream processing of a streaming platform system is disclosed. The method includes the electronic device receiving a request to process a video source and creating a task graph based on the request, where the task graph is a directed acyclic graph of tasks for processing the video source, where each node of the task graph represents a processing task, and where each edge of the task graph represents a data flow across two processing tasks and corresponding input and output of each processing task. The method also includes the electronic device estimating resource requirements of each processing tasks, and splitting the task graph into a plurality of subsets, wherein each subset corresponds to a task group to be executed by one or more workers of a plurality of processing units of the streaming platform system.

17 Claims, 16 Drawing Sheets

(56) References Cited

U.S. PATENT DOCUMENTS

| | | | | |
|---|---|---|---|---|
| 8,185,908 B2* | 5/2012 | Taniguchi | ............. | G06F 9/5038 709/221 |
| 8,589,992 B2 | 11/2013 | Babic | | |
| 8,607,091 B2 | 12/2013 | Asbun et al. | | |
| 8,745,628 B2* | 6/2014 | Buco | ..................... | G06F 9/5038 705/7.22 |
| 8,752,113 B1* | 6/2014 | Good | ..................... | H04N 19/40 725/115 |
| 8,768,048 B1* | 7/2014 | Kwatra | .................... | G06K 9/72 382/159 |
| 8,959,370 B2* | 2/2015 | Zomaya | ........................ | 713/300 |
| 8,984,520 B2* | 3/2015 | Liu | ....................... | G06F 1/3203 713/300 |
| 9,038,086 B2* | 5/2015 | Dees, Jr. | ............. | G06F 11/0709 714/25 |
| 2003/0142670 A1 | 7/2003 | Gould et al. | | |
| 2003/0163829 A1 | 8/2003 | Coufal et al. | | |
| 2003/0208638 A1 | 11/2003 | Abrams et al. | | |
| 2004/0047354 A1 | 3/2004 | Slater et al. | | |
| 2004/0117427 A1 | 6/2004 | Allen et al. | | |
| 2004/0128386 A1 | 7/2004 | Oomoto et al. | | |
| 2006/0195602 A1 | 8/2006 | Shibata et al. | | |
| 2007/0038567 A1 | 2/2007 | Allaire et al. | | |
| 2007/0078768 A1 | 4/2007 | Dawson | | |
| 2007/0101379 A1 | 5/2007 | Perriera | | |
| 2007/0127667 A1 | 6/2007 | Rachamadugu | | |
| 2007/0153679 A1 | 7/2007 | Jost et al. | | |
| 2007/0237185 A1 | 10/2007 | Perriera et al. | | |
| 2008/0187285 A1 | 8/2008 | Thekkethil | | |
| 2008/0225698 A1 | 9/2008 | Smith et al. | | |
| 2008/0307258 A1 | 12/2008 | Challenger et al. | | |
| 2009/0070827 A1 | 3/2009 | Barroso | | |
| 2009/0083279 A1 | 3/2009 | Hasek | | |
| 2009/0254952 A1 | 10/2009 | Sridhar et al. | | |
| 2009/0304004 A1 | 12/2009 | Huynh Van et al. | | |
| 2010/0122040 A1 | 5/2010 | Asai et al. | | |
| 2011/0022689 A1 | 1/2011 | Piepenbrink et al. | | |
| 2011/0154358 A1 | 6/2011 | Di Balsamo et al. | | |
| 2011/0167304 A1 | 7/2011 | Asbun et al. | | |
| 2011/0246621 A1 | 10/2011 | May, Jr. | | |
| 2011/0296473 A1 | 12/2011 | Babic | | |
| 2015/0103837 A1 | 4/2015 | Dutta et al. | | |
| 2016/0036693 A1 | 2/2016 | Galdy et al. | | |
| 2016/0036886 A1 | 2/2016 | Ito | | |

OTHER PUBLICATIONS

Iqbal et al, "An Analytical Approach to Model Adaptive Video Streaming and Delivery" ACM, pp. 55-58, 2010.*

Chen et al, "A Directed Acyclic Graph based Detection for RBAC Based Secure Interoperation", IEEE, pp. 759-764, 2009.*

Tao et al, "Directed Acyclic Graph Version Model Applied in Product Structure Configuration", IEEE, pp. 1-4, 2008.*

Rao et al, "Association Rule Mining Using FPTree as Directed Acyclic Graph", IEEE, pp. 202-207, 2012.*

Roig et al, "A New Task Graph Model for Mapping Message Passing Applications", IEEE Transactions on Parallel and Distributed Systems, vol. 18, No. 12, pp. 1740-1753, 2007.*

"AT&T Enhances Its Digital Media Solutions Portfolio With New Features That Expand Content Management and Delivery Capabilities", iStreamPlanet, Articles, http://www.istreamplanet.com/NewsItem.aspx?nid=113, (Apr. 13, 2010), 2 pages.

"iStreamPlanet Announces Flash Media Server 3.5 and HTTP Dynamic Streaming Support for the Adobe Flash Platform", iStreamPlanet, Articles, http://www.istreamplanet.com/NewsItem.aspx?nid=115, (May 11, 2010), 2 pages.

"iStreamPlanet announces official integration of Microsoft Silverlight Rough Cut Editor (RCE) into its Video Workflow Automation Platform (VWAP)", iStreamPlanet, Articles, http://www.istreamplanet.com/NewsItem.aspx?nid=110, (Mar. 12, 2010), 2 pages.

"iStreamPlanet announces Release of Its Video Workflow Automation Platform", iStreamPlanet, Articles, http://www.istreamplanet.com/NewsItem.aspx?nid=107, (Mar. 15, 2010), 2 pages.

"iStreamPlanet Announces Support for Microsoft Silverlight 4", iStreamPlanet, Articles, http://www.istreamplanet.com/NewsItem.aspx?nid=111, (Apr. 13, 2010), 2 pages.

"iStreamPlanet selected by NBC Sports to Provide Live Web Broadcast Experience of The 2010 US Open Golf Tournament at Pebble Beach and Championships 2010 at Wimbledon", iStreamPlanet, Articles, http://www.istreamplanet.com/NewsItem.aspx?nid=120, (Jun. 29, 2010), 2 pages.

"Record Interactive and Online Viewing for CTVOlympics.ca & RDSolympiques.ca: The Vancouver 2010 Olympic Winter Games in Review", iStreamPlanet, Articles, http://www.istreamplanet.com/NewsItem.aspx?nid=109, (Mar. 18, 2010), 2 pages.

"Spinnaker HD/7100", Inlet Technologies, www.InletHD.com., (May 2010), 2 pages.

"Spinnaker HD-X/8100", Inlet Technologies, www.InletHD.com., (May 2010), 2 pages.

"Spinnaker IP/6000", Inlet Technologies, www.InletHD.com., (May 2010), 2 pages.

Office Action, U.S. Appl. No. 12/789,106, dated Apr. 11, 2012, 26 pages.

Final Office Action, U.S. Appl. No. 12/789,106, dated Aug. 27, 2012, 30 pages.

Notice of Allowance, U.S. Appl. No. 12/789,106, dated Jul. 5, 2013, 22 pages.

Non-Final Office Action, U.S. Appl. No. 14/448,996, dated Mar. 15, 2016, 22 pages.

Notice of Allowance, U.S. Appl. No. 14/708,135, dated Mar. 21, 2016, 30 pages.

* cited by examiner

Exemplary Task Graph 350

Exemplary Task Graph Revision 352

Exemplary Task Group Split 354

METHOD AND SYSTEM FOR A GRAPH BASED VIDEO STREAMING PLATFORM

RELATED APPLICATIONS

This application is related to co-pending U.S. application Ser. No. 14/448,981, entitled "Method and System for Coordinating Stream Processing at a Video Streaming Platform," and co-pending U.S. application Ser. No. 14/448,993, entitled "Method and System for Ensuring Reliability of Unicast Video Streaming at a Video Streaming Platform," both filed herewith, which are incorporated herein by reference.

FIELD OF INVENTION

The embodiments of the invention are related to the field of delivering media contents over a network cloud. More specifically, the embodiments of the invention relate to methods and systems for supporting a video streaming platform in a cloud computing environment.

BACKGROUND

Cloud computing is changing the way that enterprises and consumers utilize applications and carrying on their tasks. In cloud computing, data and applications are stored over the Internet instead of local storage, and instead of owning all the hardware and software that data and applications reside, an enterprise or a consumer (the "client" or "tenant") utilizes some or majority of the needed hardware and software owned by a cloud provider to store the data and run the applications. Relying on sharing of resources among numerous clients, the cloud computing infrastructure (sometimes referred to as Infrastructure as a service (IaaS)) satisfies elastic demand spikes and achieves economies of scale thus becoming popular in various industries.

Efficient media content (e.g., video/audio) processing via cloud-hosted services has the potential of revolutionize the entertainment industry, sports industry and other related domains. Yet, it is challenging to process media contents (e.g., video/audio) efficiently and flexibly in a cloud computing environment, especially in real time streaming scenarios. In an IaaS model, computing resources are often offered as a number of virtual machines to a client requesting delivery of the media content, and a hypervisor manages the offered virtual machines. The virtual machines may reside on a computing device hosting applications of other clients, thus the virtual machines may become unavailable or suffer degraded performance due to activities of other clients or maintenance of the cloud provider. In addition, the resource needs of a media content in processing and delivering may change over time, thus the resource requests may need be adjusted dynamically.

Prior art has disclosed automating video work flows in a video streaming platform, see for example, U.S. patent application Ser. No. 12/789,024 by Mio Babic, entitled "Video Workflow Automation Platform," and U.S. Pat. No. 8,589,992 by Mio Babic, entitled "Video Workflow Automation Platform for Publishing a Video Feed in Multiple Formats."

SUMMARY

In one embodiment, a method is implemented in an electronic device serving as an orchestrator managing video and audio stream processing of a streaming platform system. The method includes the electronic device receiving a request to process a video source, the request containing parameters describing the video source. The method also includes the electronic device creating a task graph based on the request, where the task graph is a directed acyclic graph of tasks for processing the video source, where each node of the task graph represents a processing task, and where each edge of the task graph represents a data flow across two processing tasks and corresponding input and output of each processing task. The method also includes the electronic device estimating resource requirements of each processing task, and splitting the task graph into a plurality of subsets, where each subset corresponds to a task group to be executed by one or more workers of a plurality of workers, where each worker is a processing unit of the streaming platform system.

In another embodiment, an electronic device serves as an orchestrator managing video and audio stream processing of a streaming platform system. The electronic device contains a non-transitory machine-readable storage medium to store the orchestrator and a processor coupled to the non-transitory machine-readable storage medium. The processor to execute the orchestrator and the orchestrator is configured to: receive a request to process a video source, the request containing parameters describing the video source; create a task graph based on the request, where the task graph is a directed acyclic graph of tasks for processing the video source, where each node of the task graph represents a processing task, and where each edge of the task graph represents a data flow across two processing tasks and corresponding input and output of each processing task; estimate resource requirements of each processing task; and split the task graph into a plurality of subsets, where each subset corresponds to a task group to be executed by one or more workers of a plurality of workers, where each worker is a processing unit of the streaming platform system.

In a further embodiment, a non-transitory machine-readable medium stores instructions for managing video and audio stream processing of a streaming platform system. The instructions stored by the non-transitory machine-readable medium, when executed by a processor, cause the processor to perform operations in an electronic device serving as an orchestrator the managing video and audio stream processing of the streaming platform system. The operations include receiving a request to process a video source, the request containing parameters describing the video source. The operations further include creating a task graph based on the request, where the task graph is a directed acyclic graph of tasks for processing the video source, where each node of the task graph represents a processing task, and where each edge of the task graph represents a data flow across two processing tasks and corresponding input and output of each processing task. The operations further include estimating resource requirements of each processing task and splitting the task graph into a plurality of subsets, where each subset corresponds to a task group to be executed by one or more workers of a plurality of workers, where each worker is a processing unit of the streaming platform system.

Embodiments of the invention aim at flexibly processing media content such as real time video and audio streams in a network cloud and the created task graph allows the orchestrator to coordinate more efficiently with the workers in processing the video and audio streams and permits the streaming platform to operate efficiently and reliably using a wide range of cloud infrastructure.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
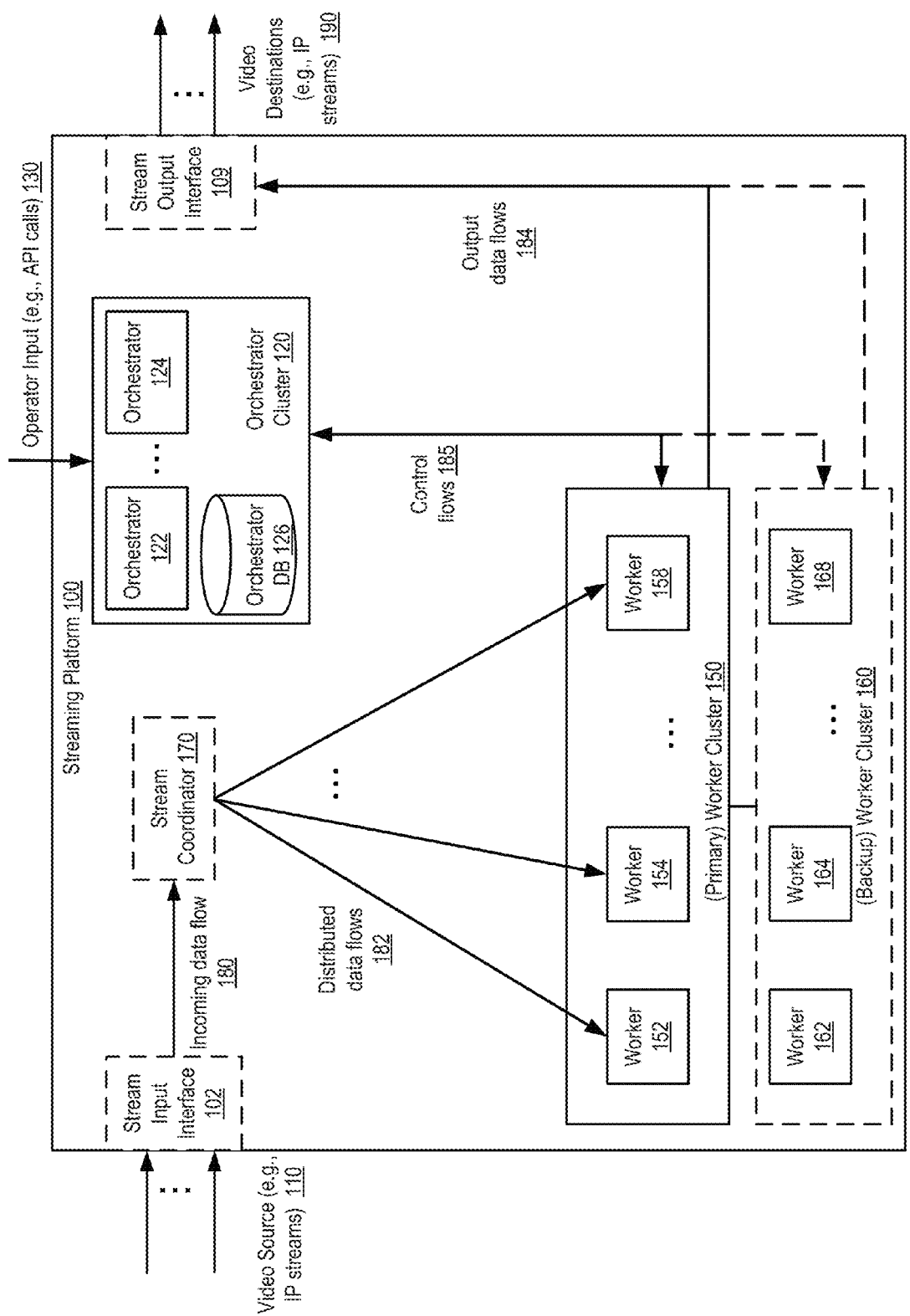
FIG. 1 illustrates a video streaming platform in a cloud computing environment according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "monitoring," "creating," "estimating," "splitting," "updating," "executing," "selecting," "initiating," "indicating," "reading," "writing," "registering," "replicating," "receiving," "communicating," "presenting," "provisioning," "publishing," "processing," "providing," "computing," "calculating," "determining," "displaying," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

An electronic device stores and transmits (internally and/or with other electronic devices over a network) code (which is composed of software instructions and which is sometimes referred to as computer program code or a computer program)

and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-transitory machine-readable memory containing the code since the non-transitory machine-readable memory can persist code/data even when the electronic device is turned off (when power is removed), and while the electronic device is turned on that part of the code that is to be executed by the processor(s) of that electronic device is typically copied from the slower non-transitory machine-readable memory into transitory machine-readable memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A Video Streaming Platform in a Cloud Computing Environment

FIG. 1 illustrates a video streaming platform in a cloud computing environment according to one embodiment of the invention. Streaming platform 100 is a computing system, and it contains one or more machines including one or more server computers, gateways, routers, or other computing/networking electronic devices. A streaming platform operator manages operations of streaming platform 100, yet some or all of the electronic devices within the streaming platform 100 may be owned by a third party (e.g., a cloud provider/operator such as Amazon.com®, Microsoft®, Rackspace®, or Computer Sciences Corporation (CSC®)). That is, a cloud computing environment operated by a cloud provider/operator may host the streaming platform.

Streaming platform 100 receives its data flow input from video source 110. Video source 110 contains one or more Internet Packet (IP) packet streams in one embodiment. The IP packet streams may contain one or more live video feeds. A live video feed may be video of a live event or live performance, or may be video of a prerecorded event being played back according to a schedule. The live video feed may be a video broadcasted over cable, satellite, or over-the-air. Note the terms "video," "video source," and "video feed," as used herein, refer to the video and corresponding audio of the particular recorded event (e.g., TV show, performance, sporting event, etc), but also may include video only. Thus the video source (sometimes referred to as the video and audio streams) of streaming platform 100 may contain only video. The video source may be a webcast of a television broadcast, such as of a sporting event, a live or recorded performance, a live or recorded news report, or the like. A live event may also have pre-recorded content intermingled with live media content, such as advertisements, which are played in between the live telecast. It should be noted that the embodiments of the invention described herein may also be used for streaming video-on-demand (VOD).

Video source 110 may be "pushed" to streaming platform 100 where the video source is IP packet streams such as the moving pictures expert group—transport streams (MPEG-TS) or a type of adaptive bitrate streaming streams (streams implemented in protocols such as MPEG-Dynamic Adaptive Streaming over HTTP (DASH), Microsoft® Smooth Streaming, or Apple® HTTP Live Streaming). The IP packet streams logically flow to streaming platform 100 from an external source thus video source 110 is referred to as being pushed to streaming platform 100.

Video source 110 may also be "pulled" by a processing unit (referred to as a worker) of streaming platform 100, where the worker runs one or more processing tasks. The worker may initiate a Transmission Control Protocol (TCP) connection to an external uniform resource identifier (URI) (an external uniform resource locator (URL) or an external uniform resource name (URN)), and after performing a protocol handshake, cause inbound IP packet streams to flow directly into the worker for one or more processing tasks without being processed by the optional stream input interface 102 or stream coordinator 170. The pull of video feeds may be implemented through the real time messaging protocol (RTMP), where the processing task includes a RTMP capture task.

Stream input interface 102 is a logical input point for data flows into streaming platform 100. It may not be present as a physical entity of streaming platform 100 in one embodiment. Incoming data flow 180 may optionally go to stream coordinator 170 (the operations of stream coordinator 170 are detailed herein below). The incoming data flow contains data of one or more video and audio streams. In one embodiment, the incoming data flow is transmitted in user datagram protocol (UDP) packets.

Figure 4A:
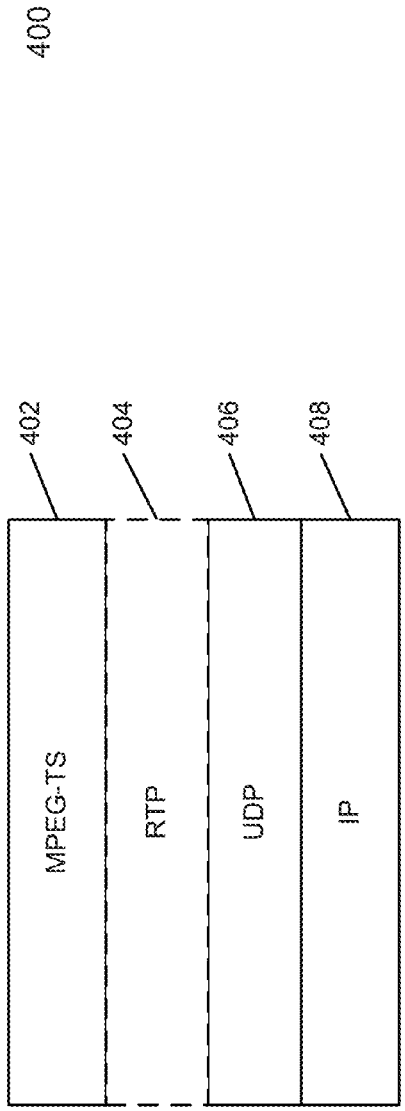
FIG. 4A illustrates headers of packets of the incoming data flow according to one embodiment of the invention.

FIG. 4A illustrates headers of packets of the incoming data flow according to one embodiment of the invention. The packet contains an IP header at reference 408, and it has a UDP header on top of IP header at reference 406. As a stateless protocol, UDP is not as reliable as TCP. Thus, the packet may optionally contain a real-time transport protocol (RTP) header at reference 404, where the RTP header adds addition information to allow the receiving end of the data flow to reorder the received packet and recover from certain level of packet loss. The packet further contains one or more MPEG-TS packets at reference 402. During transmission, the size of a typical UDP payload is limited to around 1,400 bytes in one embodiment in order to minimize fragmentation within and across public networks, which at higher video bit rates can cause very high packet arrival rates (e.g., 25 Megabits/sec=2232 UDP packets/sec).

While TCP is a lossless transport protocol and can be used to transmit the incoming data flow, TCP based transmission may come at the expense of significantly variable delay in circumstances where network congestion may occur. In the cloud computing environment, due to resource sharing among multiple clients, a data flow may experience network congestion. In addition, using TCP-based source such as RTMP for video delivery significantly complicates the ability to retrieve redundant input signals via multiple data flows, since each TCP data flow comes with its own unique delay and protocols such as RTMP do not handle transport-level synchronization well. Thus, at a streaming platform in the cloud computing environment, UDP is preferable in delivering video source.

The incoming data flow may be multicast or unicast. When the incoming data flow is a multicast data flow, it sends packets to multiple destinations simultaneously. In streaming platform 100, the multiple destinations include multiple workers, and incoming data flow 180 multicasts into distributed data flows 182 and is transmitted to workers 152-158. When the incoming data flow is a unicast data flow, stream coordinator 170 converts the unicast data flow into distributed data flows 182 thus workers 152-158 process them indiscriminately.

Workers may be organized as worker clusters in a streaming platform. In streaming platform 100, workers 152-158 are in primary worker cluster 150, which contains workers actively working on processing tasks. Workers 162-168 are in backup worker cluster 160, which contains workers remains standby thus provides redundancy and robustness for streaming platform 100. Workers perform tasks through coordination with one or more orchestrators, which may form an orchestrator cluster.

Orchestrator cluster 120 contains orchestrators 122-124 and orchestrator database 126 that store data for operations of the orchestrators. The orchestrators may form working and backup pairs within an orchestrator cluster, and the orchestrator cluster may be paired with another orchestrator cluster for redundancy and robustness purpose too. Orchestrator cluster 120 receives operator input 130 and it interacts with worker clusters 150-160 through control flow 185. Operator input 130 may be in the form of an application programming interface (API) call, and it may contain a request to create a work flow for a video source in streaming platform 100. The work flow may be referred to as a channel, each of which represents a processing work flow that transforms an individual incoming data stream into its configured output data stream(s). An orchestrator may also host services responsible for work scheduling and overall system health monitoring and management.

Workers are coupled to one or more orchestrators, and they execute processing tasks on the distributed data flows. The data flows are processed and the workers produce output data flows 184. Output data flows 184 may optionally goes through stream output interface 109, a logical output point for the data flows going out of streaming platform 100. Note both stream input interface 102 and stream output interface 109 may be integrated parts of worker functions and they may not be individual physical units of streaming platform 100.

Output data flows goes to video destination 190, which contains one or more IP streams in one embodiment. The output data flows may be delivered to an ingest point of a content delivery network (CDN). A CDN is a system of computers networked together across the Internet that cooperates transparently to deliver content, and may include, for example, one or more origin content servers, web servers, cache servers, edge servers, etc. The output data flows may also be delivered to a video playback device directly. A single output data flow may be delivered to multiple destinations through multicast.

Note both workers and orchestrators of the streaming platform may be run on cloud-hosted virtual machines (VMs). The VMs are parts of the cloud computing environment hosting the streaming platform and they reside on computing systems of the cloud computing environment. These computing systems are referred to as hosts of the workers and orchestrators in the streaming platform. The hosts are managed by a cloud provider and they may concurrently host applications other than the streaming platform. Thus, the workers are not dedicated to the streaming platform and they are allocated to the streaming platform as needed and according to coordination of the orchestrators.

Overall, streaming platform 100 ingests video sources, transcodes, and transforms the video sources into desired one or more formats for publication and then outputs the resulting video data. The streaming platform is a distributed architecture using cloud resources, and it is a flexible, scalable, and efficient platform for video processing.

Graph Based Video Data Flow Processing

Traditionally video processing is performed through a batch-oriented, non-real time video on demand architecture. In contrast, embodiments of the invention utilize a real-time or near real-time streaming approach via a distributed graph of tasks. The approach achieves several goals: It may minimize end-to-end system latency for the video source processing; it offers flexibility for deploying the streaming platform into diverse cloud hardware infrastructures; and it allows flexibility to achieve system reliability targets in a given cloud hardware infrastructure.

The distributed graph of tasks is utilized in creating the processing work flow (referred to as a channel) that transforms an individual incoming data stream into its configured output data stream(s). During channel creation, the orchestrator is responsible for compiling a channel definition (e.g., using the JavaScript Objection Notation (JSON) format) into a directed graph of tasks with associated configuration data and for assigning those tasks into logical groups (referred to as task groups) based on estimated resource requirements. The available workers may then poll the orchestrator seeking work that they have sufficient resources to handle. Once assigned one or more task groups, a worker launches appropriate task running processes with the specified configuration. The task running processes are then executed as part of the graph based video data flow processing.

Figure 2:
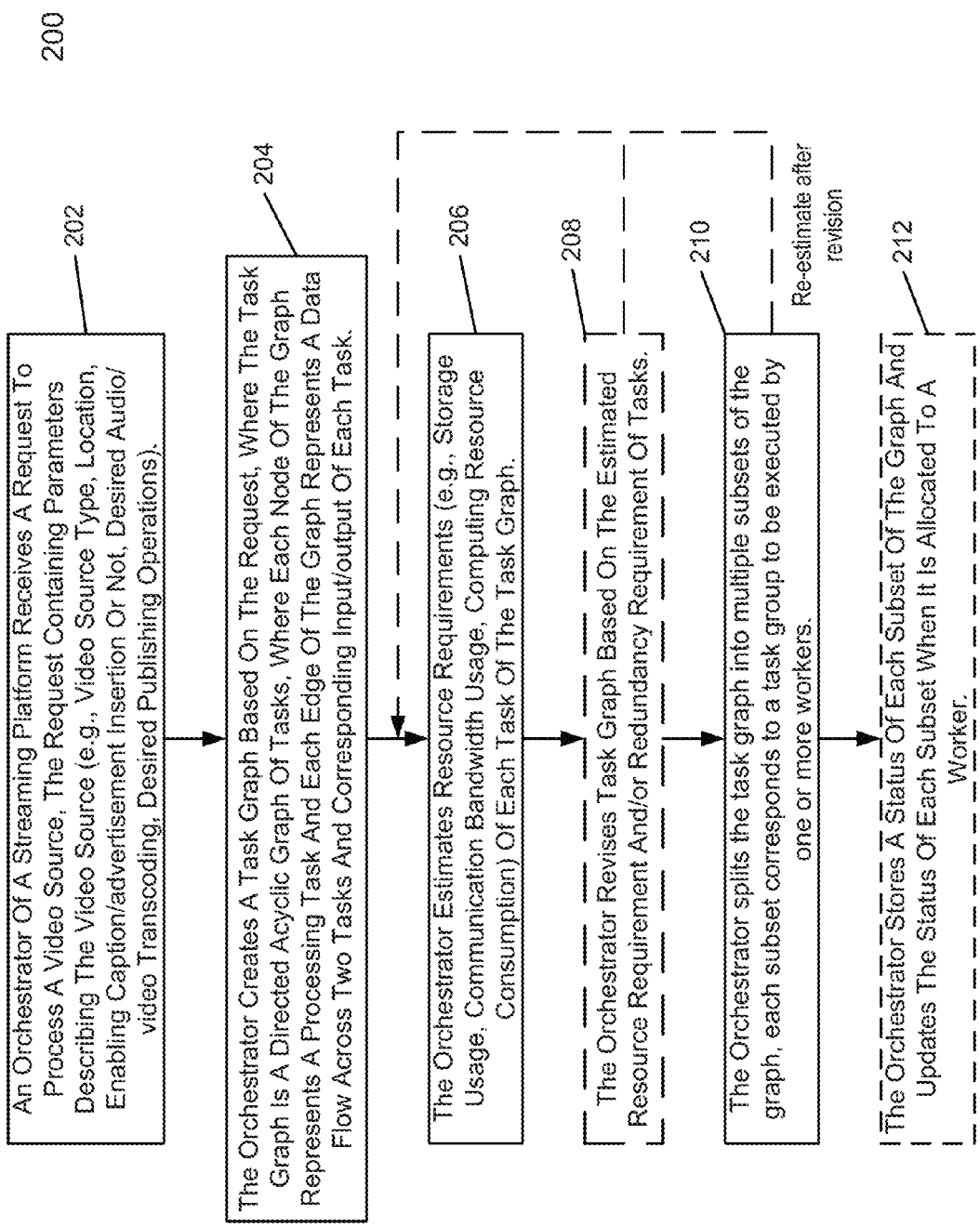
FIG. 2 is a flow diagram illustrating the method of creating a distributed graph of tasks at a video streaming platform in a cloud computing environment according to one embodiment of the invention.

FIG. 2 is a flow diagram illustrating the method of creating a distributed graph of tasks at a video streaming platform in a cloud computing environment according to one embodiment of the invention. Method 200 may be implemented on an orchestrator of the video streaming platform, which also contain workers as the processing units of the streaming platform.

At reference 202, the orchestrator receives a request to process a video source. The request may be received through an operator input (e.g., an API call) as illustrated in FIG. 1. The request containing parameters describing the video source. The request (may be referred to as a channel creation request) may contain a variety of parameters describing the video source. For example, the request may contain at least one of the following:

Mandatory parameters describing the type of the video source (e.g., MPEG-2, MPEG-4, H.265, and etc.), and location of the video source (e.g., ingest protocol, IP address, URI, and etc.).

Indication of whether and how to enable subtitle processing and/or enable advertisement insertion processing for the video source.

The desired video and audio transcoding operations (e.g., how many audio/video layers, the desired output characteristics for each such as video frame size/rate and bitrate, the relevant portion of the incoming data flow to use if applicable) for the video source.

The desired contention protection operations for the video source (e.g., Microsoft© PlayReady, Adobe© Access DRM, AES-128 Encryption for HTTP live streaming, etc.).

The desired publishing operations to output (e.g., which output format(s) (such as HTTP live streaming (HLS), HTTP dynamic streaming (HDS), RTMP, or smooth streaming) to publish, and the destination(s) to send each output format.

Then at reference 204, the orchestrator creates a task graph based on the received request. The task graph is a directed acyclic graph (DAG) of tasks for processing the video source. A DAG is a directed graph with no directed cycles. The directed graph is formed by a collection of nodes (also referred to as vertices) and directed edges, each edge connecting one node to another, such that there is no way to start at a node and follow a sequence of edges that eventually loops back to the node. Each node of the task graph represents a processing task, and each edge represents a data flow across two processing tasks and corresponding input and output of each processing task.

Figure 3A:
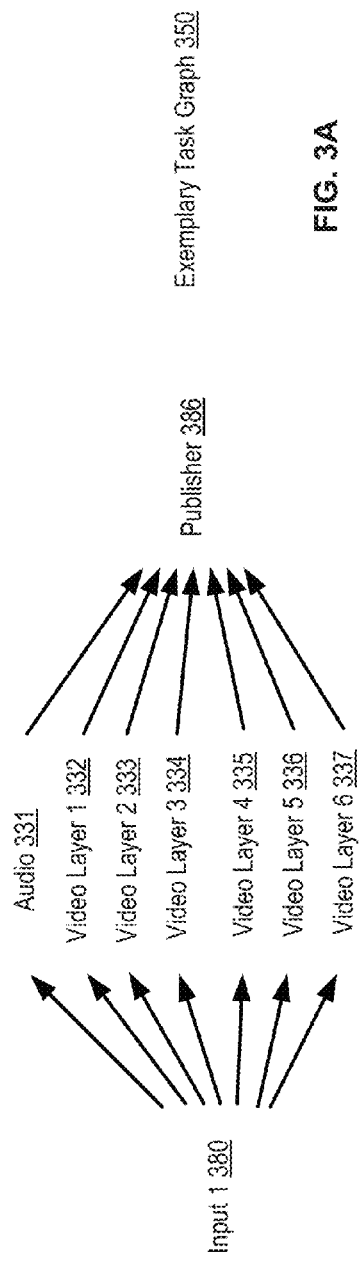
FIG. 3A illustrates an exemplary task graph according to one embodiment of the invention.

FIG. 3A illustrates an exemplary task graph according to one embodiment of the invention. Task graph 350 contains one input node, input 1 at 380. The input 1 represents an input processing task, which is to receive and prepare the video source for further processing. The output of input 1 is sent to nodes audio 331, and video layers 1-6 at 332-337 respectively. The nodes represent processing tasks associated with the respective audio and video layers of the video source. After the audio and videos are processed through transcoding operations at 332-337, the outputs are sent to the node of publisher 386, where the processing task is to publish the processed video source in desired output format(s) to the desired destination(s). While the majority of the nodes (331-337) of task graph 350 only have a single input and a single output, the layout is for simplicity of illustration. A task graph may contain tens or even hundreds of nodes, and each node may have multiple inputs and multiple outputs.

Figure 4B:
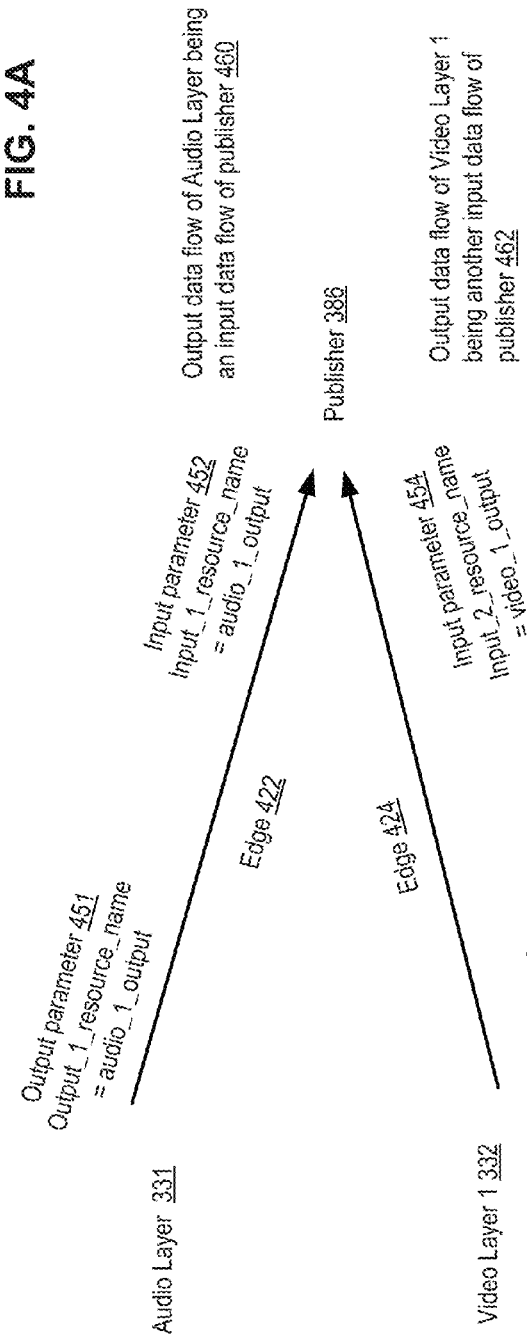
FIG. 4B illustrates the relationship between adjacent nodes in a portion of a task graph according to one embodiment of the invention.

FIG. 4B illustrates the relationship between adjacent nodes in a portion of a task graph according to one embodiment of the invention. The task graph is task graph 350 illustrated in FIG. 3A, and the illustrated portion includes audio layer 331, video layer 1 at 332, publisher 386, and edges 422-424. Audio layer 331 produces one output. The output contains output parameter 451, which is referred to by an output resource name (output_1_resource_name) and the value is audio_1_output. Represented by edge 422, the output of audio layer 331 is an input of publisher 386, and that input contains input parameter 452, which is referred to by an input resource name (input_1_resource_name), and the value of the input parameter to publisher 386 is the same as the value of the output parameter 451, audio_1_output. Similarly, video layer 1 at 332 produces an output containing output parameter 453, which is referred to as output_1_resource_name, and the value is video_1_output. The output of video layer 1 at 332 is another input of publisher 386, and that input contains input parameter 454, which is referred to by input_2_resource_name and its value is the same (video_1_output).

Note that while the input and output parameters in the example are single values respectively, some edges of a task graph may contain a plurality of input parameters and/or a plurality of output parameters, in which case the input parameters and output parameters are referred to as the input parameter set and the output parameter set respectively. Each of the input and output resource names represents resource(s) involved for the respective inputs and outputs. The reading and writing of the inputs and outputs are done via API calls to a service called the segment store that runs on every worker in one embodiment. Further details of the operations of the segment store are disclosed herein below.

Referring back to FIG. 2, after the task graph is created, the orchestrator estimates resource requirements for each processing task represented in the task graph at reference 206. The estimation of resource requirements may be based on a variety of factors, including one or more of the following:

Storage usage of each processing task during its execution cycle. A processing task may store data for diagnostics and monitoring prior, during, and after its execution, and the total storage need and the changing storage need over time are resource requirements to be considered.

Communication bandwidth usage of each processing task during its execution cycle. A processing task may need certain (changing) bandwidth for communication during its execution cycle.

Computing resource consumption of each processing task during its execution cycle. The computing resource consumption may be an absolute or relative usage of a central processing unit (CPU), a graphics processing unit (GPU), or other processing units of the processing tasks. The estimation can be complicated when the orchestrator considers various characteristics of one or more inputs of a processing task. For example, the estimated CPU/GPU usage may vary widely with inputs having different frame sizes, frame rates, input encoding/decoding (codec) schemes, and presumed content complexity (e.g., talking head vs. high motion sports). In one embodiment, orchestrator may over-estimate computing resource consumption of each processing task to avoid complicated computation in making the estimation and to avoid fragmentation of available computing resources into unusably small units.

Note the estimation of resource requirements may utilize one or more machine-learning algorithms to allow the orchestrator make better estimation over time. In which case, an earlier estimation of resource requirements is used for workers to execute processing tasks, and the worker may provide feedback about the accuracy of the estimation. Using the feedback, the orchestrator may adjust its estimation of resource requirements for a same or similar processing task or video source in the future. The feedback loop may constantly improve the accuracy of the estimation of resource requirements. Thus, the estimation may be referred to as a prediction, which is made based on the characteristics of a video source and the similarity of the characteristics of the video source comparing to an earlier video source processed by the streaming platform.

Figure 3B:
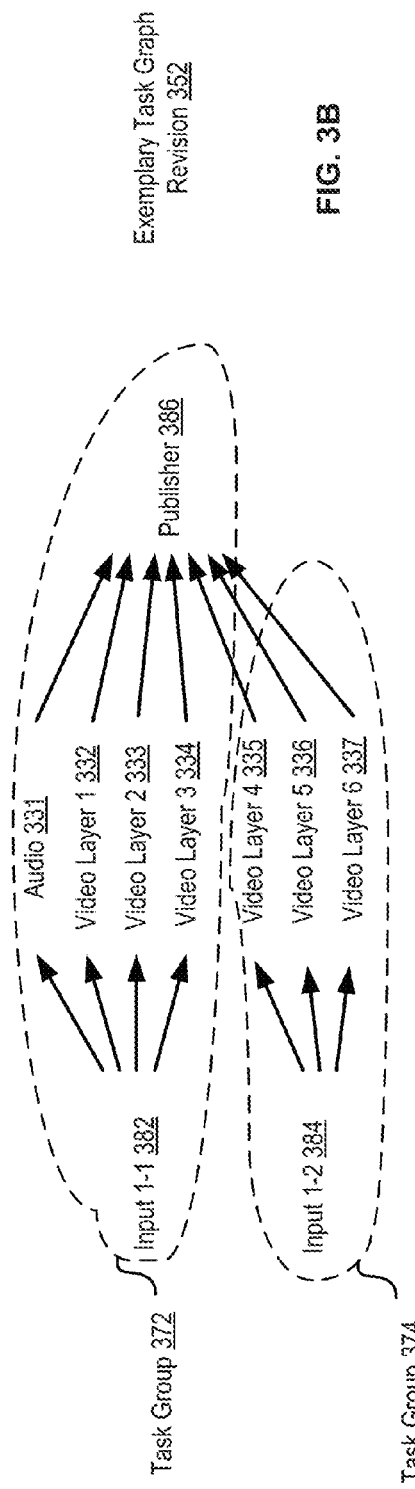
FIG. 3B illustrates a task graph revision according to one embodiment of the invention.

The flow optionally goes to reference 208, where the orchestrator revises the task graph. The revision may be based on the estimation of the total resource requirements of the processing tasks for a channel. For example, the computational resource requirements for the processing tasks may be too much for a single VM that hosts a worker being assigned the processing tasks for the channel, thus the graph may be revised to split the processing tasks into two groups. FIG. 3B illustrates a task graph revision according to one embodiment of the invention. The task graph in FIG. 3B is similar to the one in FIG. 3A, but it has two inputs instead of one: Input 1 at 382 and input 2 at 384. The processing task of input 1 at 380 in FIG. 3A is split into two in FIG. 3B. The split may be due to redundancy requirements of input 1 at 380 or may be done in order to minimize the networking utilization across multiple workers (often implemented on multiple VMs in one embodiment). For example, the orchestrator may determine that a video processing task is too computationally intensive to be processed by a single worker. In the example in FIGS. 3A-B, input 1 at 380 corresponds to an input of a work flow where a single worker does not have sufficient resources to process the entire graph. Since input redundancy is important in this example, input 1 at 380 is cloned into two inputs, input 1-1 and input 2-2 at 382 and 384 respectively, where the two inputs are collocated to produce outputs to respective sets of processing tasks. Of course, the split of processing tasks for the audio, the video layers, and the publisher may also be performed in task graph revision as needed.

In an alternative embodiment, a video processing task is split into two cooperating tasks that together achieve the same processing results as the original task, but are assigned to two separate task groups for execution on two workers. In one embodiment, a streaming video processing task can be split in two based on time partitioning of the task, with one task handling half of the input data alternating with the other task handling the remaining input data. The cloning of processing tasks and time partition of processing tasks are only two exemplary ways to revise task graphs, and others may be implemented utilizing the principle of embodiments of the invention.

The revision may also be based on a redundancy requirements of one or more processing tasks. For some video source, the streaming platform is required to provide redundancy in processing (e.g., the requirement is dictated through a service level agreement (SLA) between a client and the operator of the streaming platform). In that case, orchestrator may tie certain tasks associated with the video source to either a working or backup worker cluster and that will cause revision of the task graph.

Referring back to FIG. 2, the orchestrator then splits the task graph into multiple subsets at reference 210. Each subset of the task graph corresponds to a task group to be executed by one or more workers of the streaming platform. A task group contains a set of processing tasks that the orchestrator allocates to be executed by one or more workers. In one embodiment, each subset of the task graph corresponds to a task group to be executed by a single worker.

Figure 3C:
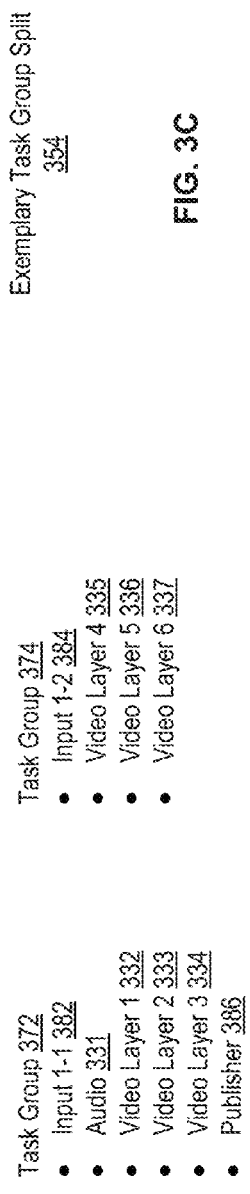
FIG. 3C illustrates a task group split according to one embodiment of the invention.

FIG. 3C illustrates a task group split according to one embodiment of the invention. In the task group split 354, the revised task group 350 is split into two task groups: Task group 372 including processing tasks input 1, audio, video layer 1-3, and publisher, and task group 374, including processing tasks input 2, and video layer 4-7. Each of task groups 372 and 374 are to be executed by a single worker of the streaming platform. Each worker may run on a single VM of the cloud computing environment on which the streaming platform is operating.

Note that after either the task graph revision at reference 208 or the task graph split at reference 210, the orchestrator may go back to reference 206 to re-estimate the resource requirements of processing tasks as the task graph revision and split may impact workloads (e.g., storage usage, communication bandwidth usage, and computing resource consumption) associated with processing tasks. In an alternate embodiment, the orchestrator simply overestimates the resource requirements of the processing tasks to allow for changes of workloads.

Then optionally at reference 212, the orchestrator stores a status of each subset of the task graph and updates the status of each subset when the subset is allocated to one or more workers for execution. In one embodiment, the orchestrator stores the status in orchestrator database 126 as illustrated in FIG. 1. Thus the orchestrator keeps up-to-date information of task allocation for each video source. Note method 200 is described using one video source, in practice, an orchestrator may allocate workers for many video sources concurrently.

Also note that the creation, revision, and split of the task graph is based on the request to process the video source only, and the operations do not need the video source being available to the streaming platform. Orchestrator may perform the operations without knowing the availability and health of the workers of the streaming platform.

Coordinating Stream Processing At a Video Streaming Platform

Figure 5:
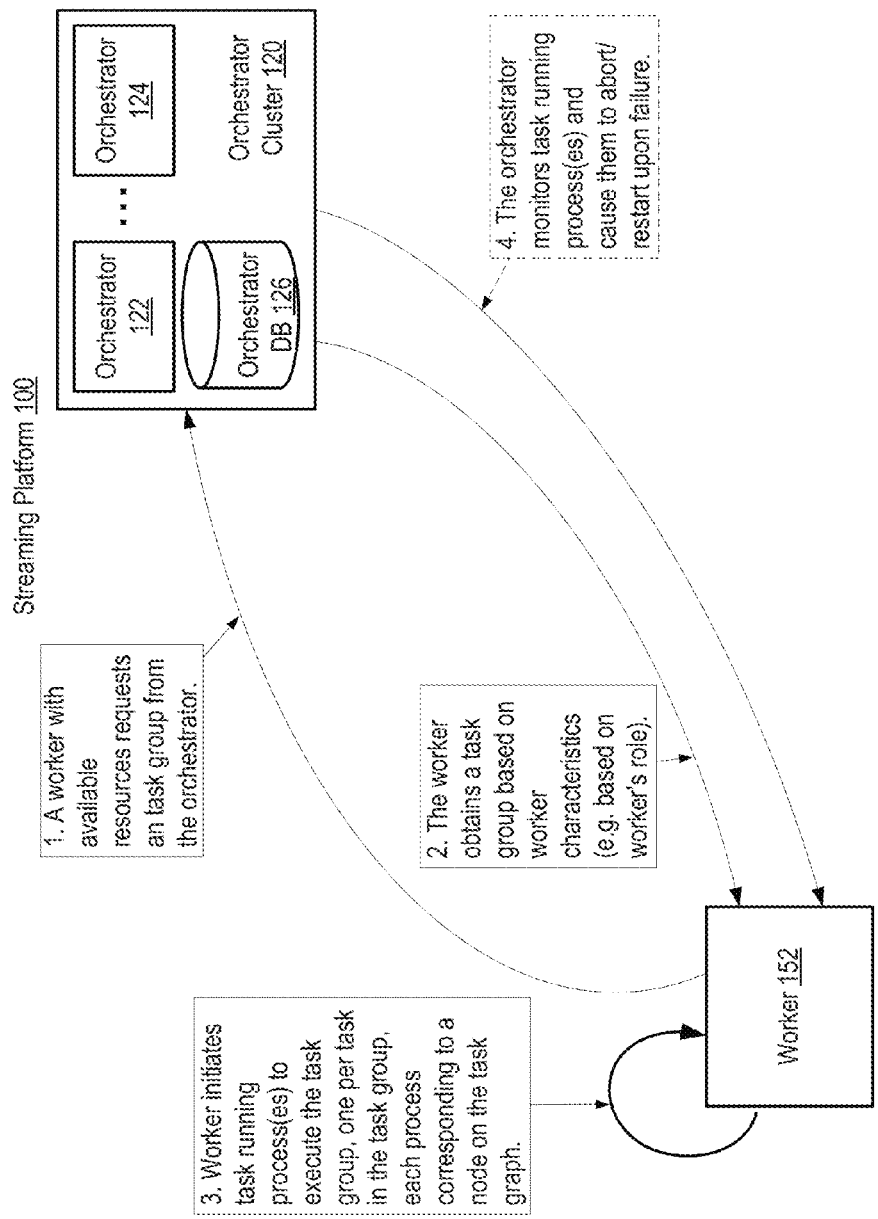
FIG. 5 illustrates coordinating stream processing at a video streaming platform in a cloud computing environment according to one embodiment of the invention.

As discussed herein above, a task graph is split into multiple subsets and each subset corresponds to a task group to be executed by one or more workers. The execution of the task group is performed at the one or more workers with coordination of the orchestrator. FIG. 5 illustrates coordinating stream processing at a video streaming platform in a cloud computing environment according to one embodiment of the invention. The streaming platform 100 is the same as the one in FIG. 1, but entities not essential to the discussion of the coordination are omitted in FIG. 5 for clarity of discussion. Task boxes 1 to 4 illustrate the order in which operations are performed according to one embodiment of the invention.

Worker 152 is a worker with available resources to execute one or more processing tasks. In one embodiment, worker 152 is idle without executing any processing task. At task box 1, worker 152 requests a task group from the orchestrator. The request may take the form of a periodic API call to the orchestrator in one embodiment.

At task box 2, the worker receives a task group allocated for the worker from the orchestrator. The received data may be a message including an identifier of the task group allocated to the worker. The orchestrator may update the status of the task group upon allocating the task group to the worker. The allocation is based at least partially on characteristics of the worker. For example, the characteristics may include:

The role of the cluster of the worker (primary cluster vs. backup cluster).

Current and/or historical health statuses of the worker (working function normally or having degraded performance)

The software versions of and the functionalities supported by the worker.

The hardware capability of the host computing devices of the worker.

Then at task box 3, the worker initiates one or more task running processes to execute the allocated task group. Each task running process corresponds to one processing task in the task group, where each processing task corresponds to a node of the task graph created by the orchestrator. The operations to execute the allocated task group are discussed in more details herein below. In an alternate embodiment, the worker isolates tasks from each other during execution using lighter weight mechanisms (e.g. application domains, containers, etc.) instead of OS processes.

Optionally at task box 4, the orchestrator monitors the execution of task running processes and causes them to abort and/or restart upon failure/recovery. The worker obtains a status of each of the task running processes during their execution cycles from the task running processes. The health indication of a task running processes may be updated dynamically during its execution cycle. An updated status may be sent to the orchestrator upon a certain event (e.g., failure/performance degradation of the worker) via an API call in one embodiment. In alternative, the orchestrator may probe the worker periodically to determine the current status of the task running processes. Upon determining the failure/performance degradation of the worker, the orchestrator may cause the task running process to abort and go through a diagnostic procedure to restart the task running process upon recovery. In an alternate embodiment, the worker may cause the task running process to abort and go through the diagnostic procedure to restart the test running process.

Figure 6:
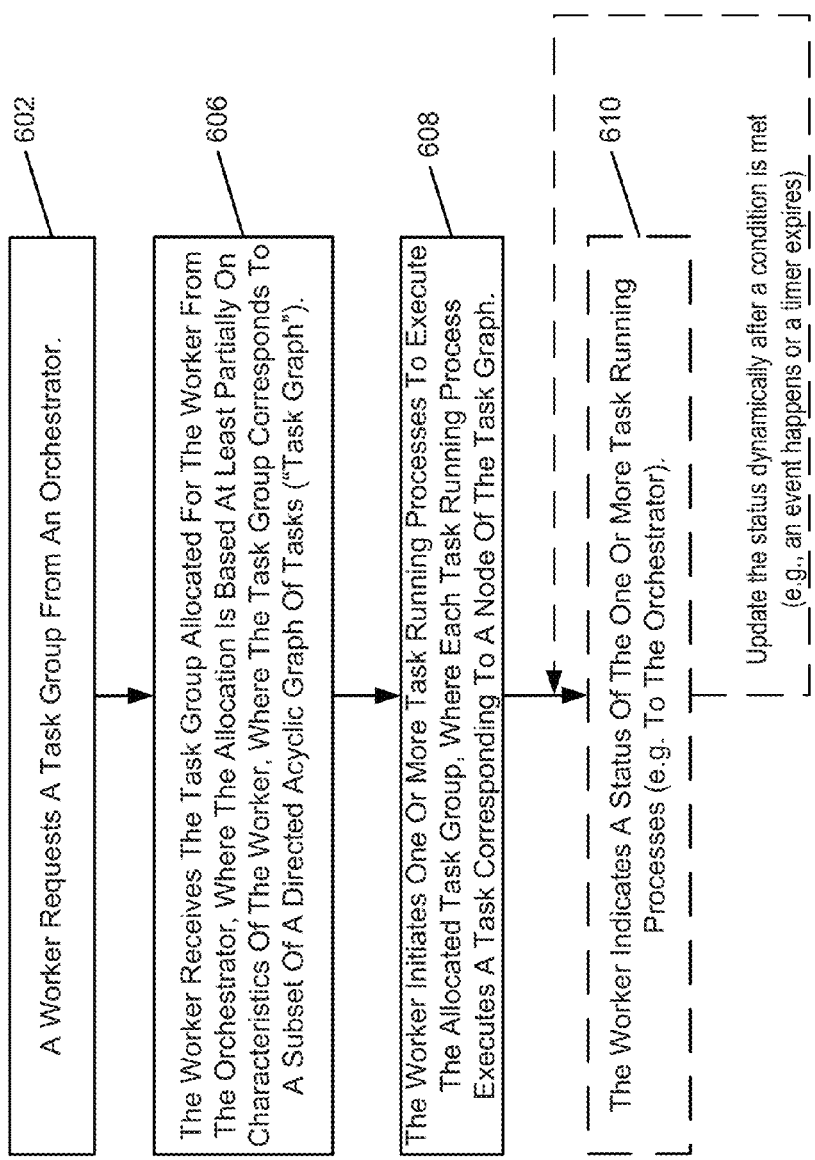
FIG. 6 is a flow diagram illustrating the operations of a worker in coordination with an orchestrator of a streaming platform according to one embodiment of the invention.

FIG. 6 is a flow diagram illustrating the operations of a worker in coordination with an orchestrator of a streaming platform according to one embodiment of the invention. Method 600 may be implemented in a worker such as worker 152 as illustrated in FIG. 5.

At reference 602, the worker requests a task group from the orchestrator of the streaming platform. Then at reference 606, the worker receives the task group allocated for the worker from the orchestrator. The allocation is based at least partially on characteristics of the worker. The task group corresponds to a subset of a task graph of the orchestrator. The task graph is a directed acyclic graph of tasks as discussed herein above in relating to FIGS. 2-4.

Referring back to FIG. 6, at reference 608, the worker initiates one or more task running processes to execute the allocated task group, where each task running process executes a processing task corresponding to a node of the task group. The execution includes at least one of (1) processing one or more inputs corresponding to an incoming edge to the node; and (2) producing one or more outputs corresponding to one or more outgoing edges from the node. Thus, the processing task may process one or more inputs without producing any output, produce one or more outputs without processing any input, or perform both the processing the input(s) and producing the output(s).

At reference 610, the one or more task running processes indicate their respective statuses during the execution cycles. Each status may be utilized to determine aborting or restarting a task running process. In one embodiment, the status is utilized by the worker to make the determination. In an alternate embodiment, the status is utilized by the orchestrator to make the determination. The status may be updated dynamically after one or more conditions are met, such as an event happens (e.g., the process failed or its performance is degraded) or a timer expires.

Embodiment of Executing a Task Running Process

Figure 7:
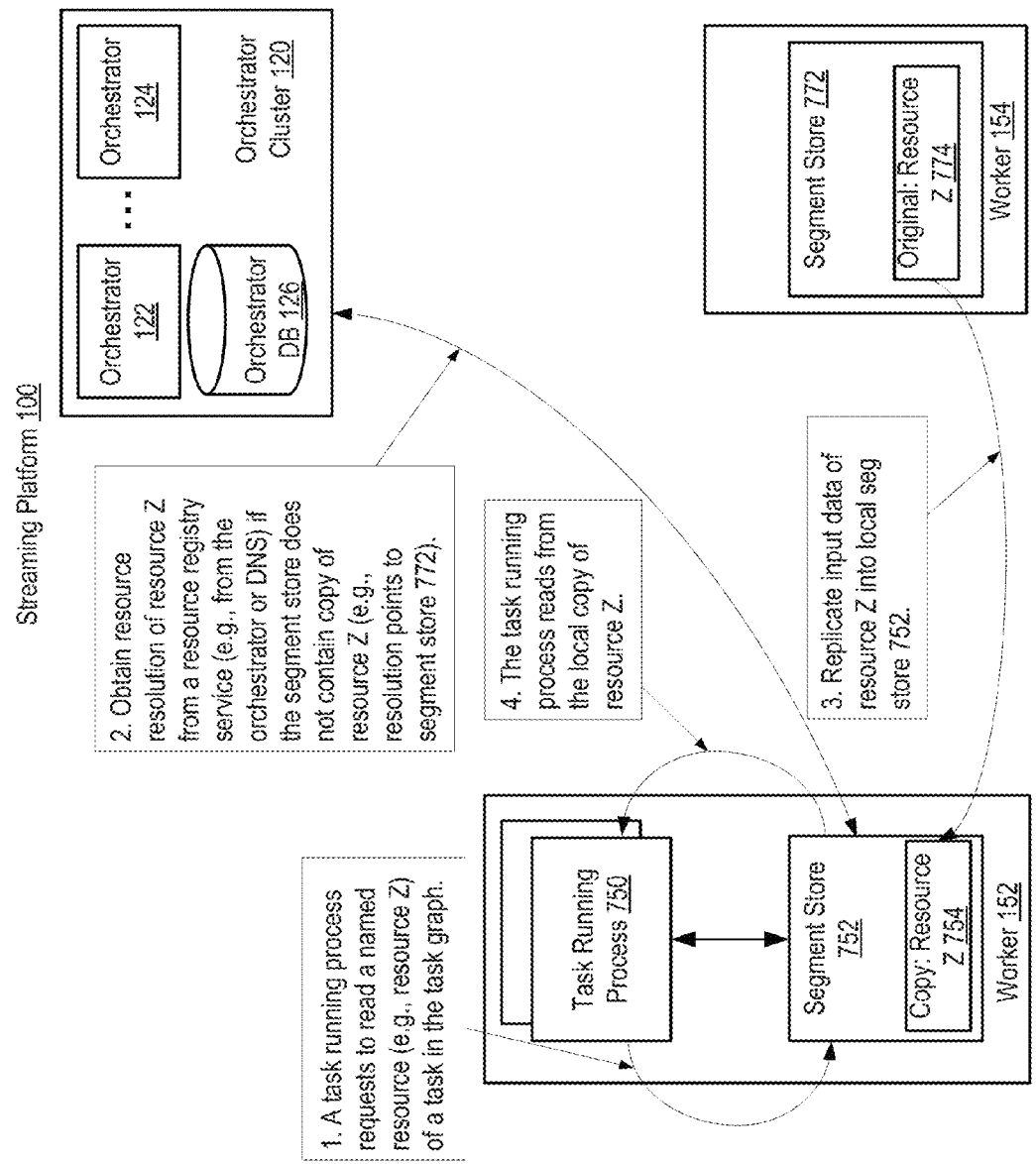
FIG. 7 illustrates the execution of a task running process reading an input at a worker according to one embodiment of the invention.

Executing a task running process at a worker is one key feature of the graph based video streaming platform in a cloud computing environment. FIG. 7 illustrates the execution of a task running process reading an input at a worker according to one embodiment of the invention. The streaming platform 100 is the same as the one in FIG. 1, but entities not essential to the discussion of the coordination are omitted in FIG. 7 for clarity of discussion. Task boxes 1 to 4 illustrate the order in which operations are performed according to one embodiment of the invention.

For executing a task running process at a worker, the task running process interacts with a service called the segment store that runs on each worker in one embodiment. The task running process reads input and writes output via API calls to the segment store. The segment store is responsible for advertising locally created logical resource names with a central resource registry, for storing a sliding window of recent data in memory for each resource, for resolving any requests to read logical resources via the central resource registry, and for establishing mirror copies of logical resources in the local segment store via a cross-VM streaming network protocol. Note that the central resource registry is provided by a resource registry service, and the resource registry service may be provided by the orchestrator or a domain name system (DNS).

By abstracting away the network protocol and name resolution of logical resource names behind the API calls to the segment store, all processing tasks may be executed in a location agnostic fashion, which achieves maximum flexibility by centralizing resource placement decisions within the orchestrator's graph compilation and resource scheduling services. The processing tasks simply write data as necessary to the outputs and read data as necessary from the inputs.

Note that a worker may execute multiple task running processes, and they may be coordinated by a task manager (not shown), a service of the worker. The task manager spawns one task running process for each task, passing one or more parameters (referred to as a parameter set) associated with the task. Thus, the task manager may manage many task running processes on a worker simultaneously.

The operations of a task running process are illustrated through the task boxes 1-4. At task box 1, the task running process 750 requests to read a named resource of the task corresponding to the tasking running process. In this example, the named resource is resource Z. Z is the logical name of an input which was supplied in the processing task's input parameter set, which was created during graph creation and maintained during any revision and split as discussed above in relating to FIGS. 2-4. Task running process 750 then looks for the named resource Z at segment store 752 of the worker (referred to as the local segment store).

If task running process 750 finds resource Z at the local segment store, it reads resource Z from the local segment store as the input arrives from another processing task or the incoming data flow for executing the task. However, task running process 750 may not find resource Z at the local segment store, in which case segment store 752 obtains resource resolution of resource Z from a resource registry service at task box 2. The resource registry service may be provided by a central resource registry stored in orchestrator database 126 in one embodiment. In another embodiment, the central resource registry is stored by a DNS as discussed herein above.

In this example, the central resource registry is stored in orchestrator database 126, and the resolution points to segment store 772 as the location of resource Z at reference 774. Segment store 772 is a service in another worker, worker 154. In one embodiment, the location of resource Z is provided in a message containing the location information using the format of IP: port from the central resource registry to segment store 752.

Then at task box 3, segment store 752 replicates data of the resolved resource Z into the local segment store 752 through a replication connection to the source location at reference 774. In one embodiment, segment store 752 initiates a TCP connection to the source location at reference 774 on the designated IP: port location of segment store 772, and initiates a streaming resource replication connection of resource Z. At task box 4, the task running process 750 reads from the local copy of resource Z in performing the task running process to execute the task.

Figure 8:
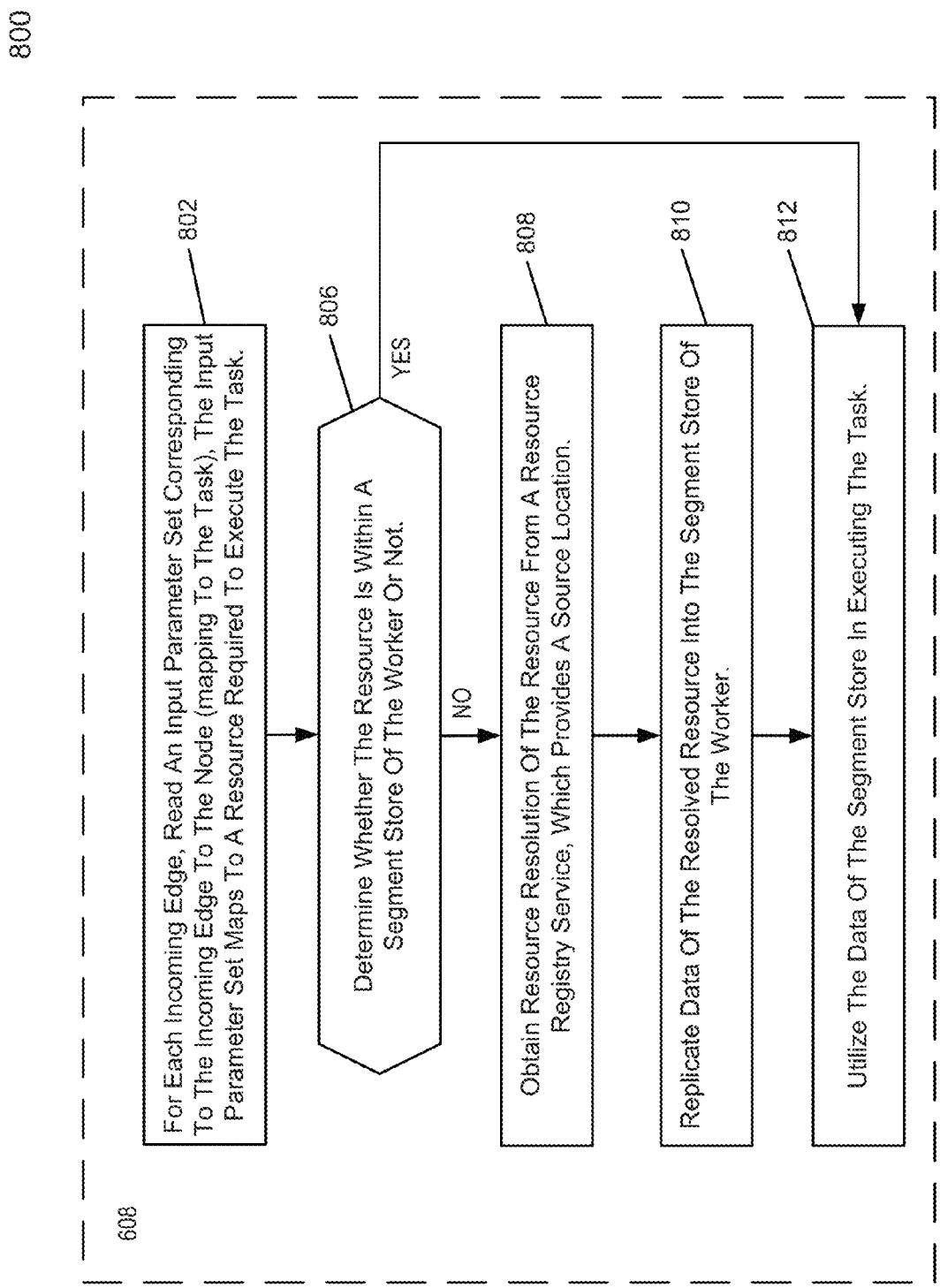
FIG. 8 is a flow diagram illustrating the execution of a task running process reading an input at a worker according to one embodiment of the invention.

FIG. 8 is a flow diagram illustrating the execution of a task running process reading an input at a worker according to one embodiment of the invention. Method 800 is an embodiment of operations in reference 608 of FIG. 6 according to one embodiment of the invention. Method 800 may be performed for each incoming edge of a node of a task graph, where the node corresponds to the processing task performed by a worker. Method 800 is performed by the worker, or more specifically by a task running process and a segment store of the worker.

At reference 802, in order to execute a processing task corresponding to the node, for each incoming edge, the task running process reads an input parameter set corresponding to the incoming edge to the node from the segment store, which stores resources of the worker. The input parameter set maps to a resource required to execute the processing task. At reference 806, the segment store determines whether the resource is within the segment store of the worker (referred to as the local segment store) or not. If the resource is within the segment store of the worker, the flow goes to reference 812, where the segment store provides the data for the task running process to utilize in executing the processing task.

If the resource is not within the segment store of the worker, the flow goes to reference 808, where the segment store obtains resource resolution of the resource from a registry service, which provides a resource location of the resource.

The registry service may be provided by a central resource registry at the orchestrator or a DNS at a different location of the cloud computing environment.

At reference 810, the segment store of the worker replicates data of the resolved resource into the segment store of the worker through a replication connection to the source location. As discussed herein above, the replication connection may include a streaming resource replication connection of the resolved resource, which may be stored in a segment store of another worker. After the data is replicated in the local segment store, the flow goes to reference 812 again, and the segment store provides the (replicated) data for the task running process to utilize in executing the processing task.

Figure 9:
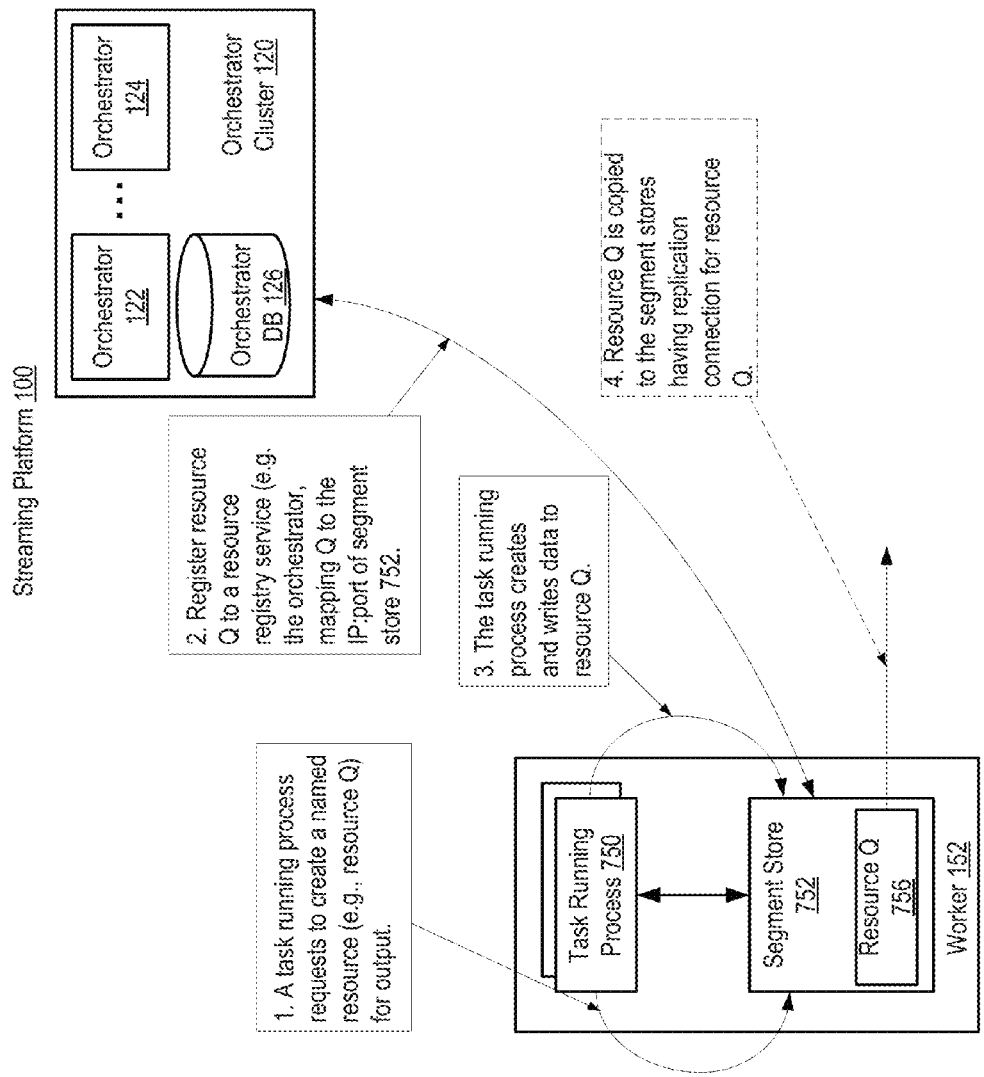
FIG. 9 illustrates the execution of a task running process producing an output at a worker according to one embodiment of the invention.

In contrast to FIG. 7, FIG. 9 illustrates the execution of a task running process producing an output at a worker according to one embodiment of the invention. The streaming platform 100 is the same as the one in FIG. 1, but entities not essential to the discussion of the coordination are omitted in FIG. 9 for clarity of discussion. Task boxes 1 to 4 illustrate the order in which operations are performed according to one embodiment of the invention.

At task box 1, task running process 750 requests to create a named resource for output at segment store 752 of worker 152. The task running process produces output as it executes a processing task, and the named resource is where the produced output will be referred. The named resource (referred to as resource Q in this example) maps to an output parameter set corresponding to the outgoing edge from the node of the task graph.

At task box 2, segment store 752 registers resource Q to a resource registry service. In this example, the resource registry service is provided by orchestrator database 126, which contain a central resource registry. In an alternative embodiment though, the resource registry service may be provided by a DNS or another entity within the cloud computing environment. In one embodiment, the central resource registry stores with a resource registration API the name of the resource (resource Q) and its current location (e.g., using the format of IP: port) indicating that resource Q is in segment store 752.

Then at task box 3, the task running process creates the named resource and writes data to resource Q 756, which is at the local segment store (segment store 752) of worker 152. At task box 4, if a replication connection is established for resource Q in segment store 752, the data being written to resource Q are copied to all segment stores having the replication connection to resource Q. Note while creating the named resource is illustrated after registering the resource in the figure, the operations may occur simultaneously or the creating the named resource occurs prior to the registering the resource in an alternative embodiment.

Figure 10:
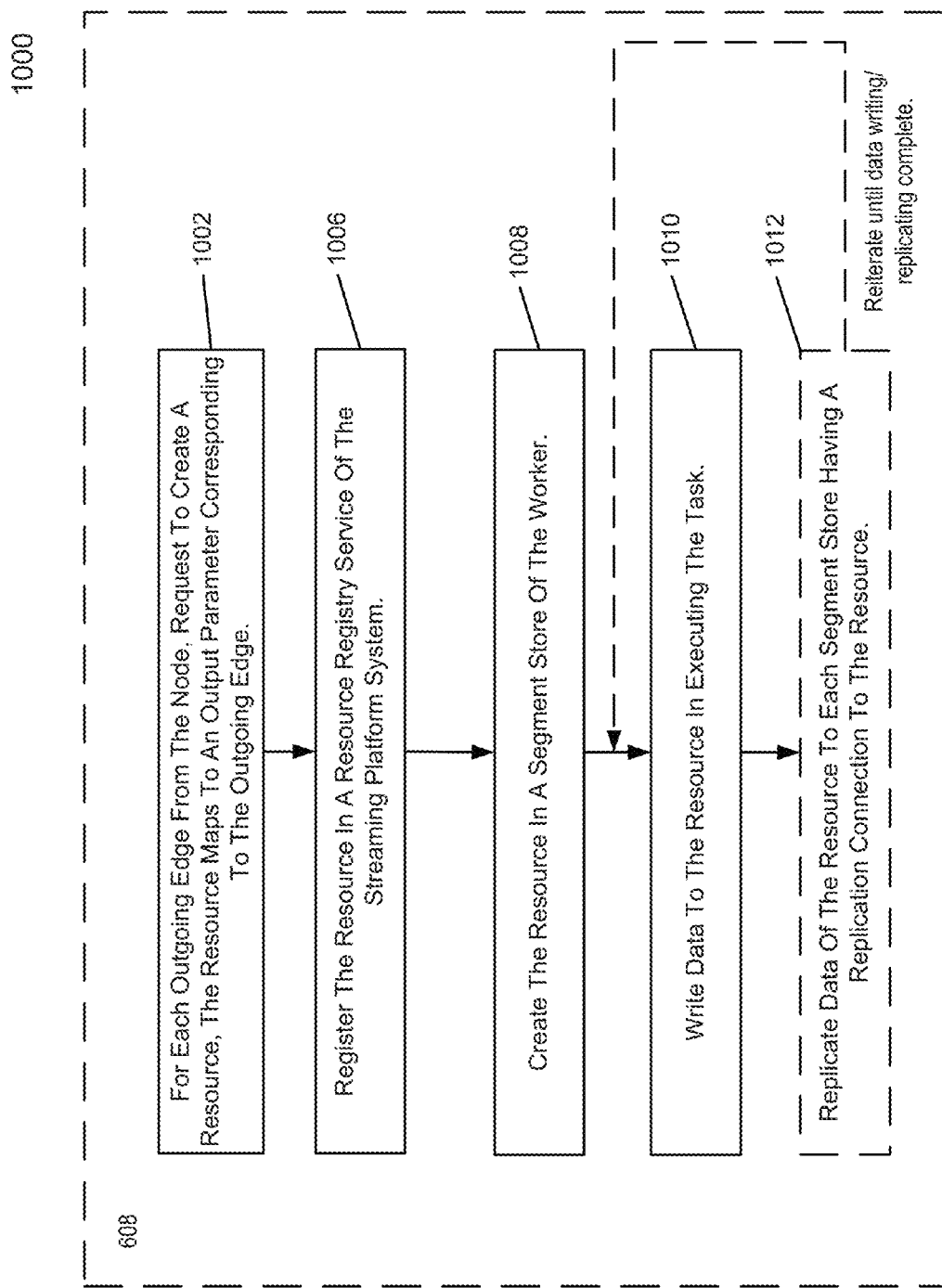
FIG. 10 is a flow diagram illustrating the execution of a task running process producing an output at a worker according to one embodiment of the invention.

FIG. 10 is a flow diagram illustrating the execution of a task running process producing an output at a worker according to one embodiment of the invention. Method 1000 is an embodiment of operations in reference 608 of FIG. 6 according to one embodiment of the invention. Method 1000 may be performed for each outgoing edge of a node of a task graph, where the node corresponds to the processing task performed by a worker. Method 1000 is performed by the worker, or more specifically by a task running process and a segment store of the worker.

At reference 1002, in order to execute a processing task corresponding to the node, for each outgoing edge, the task running process requests to create a resource, where the resource maps to an output parameter set corresponding to the outgoing edge from the node. At reference 1006, the segment store registers the resource in a resource registry service, which may reside in the orchestrator, a DNS or other entities of the cloud computing environment.

At reference 1008, the resource is created in the segment store of the worker. Then the processing task writes data to the resource in executing the processing task at reference 1010. Optionally at reference 1012, the segment store replicates data of the resource to all segment stores having replication connections to the resource. The writing/replicating of data is an iterative process, thus the process does not complete until all data to be written/replicated are finished.

Ensuring Reliability of Unicast Video Streaming

As discussed herein above, at a streaming platform in the cloud computing environment, UDP is preferable in delivering video source data. Multicasting UDP data flows has the advantage of simultaneously sending packets to multiple workers thus multiple workers may execute processing tasks, avoiding single point of failure. Yet, many public cloud computing environments do not support IP multicast for technology, security, and business reasons. In addition, the same public cloud computing environment does not guarantee the availability of any particular VM that may be utilized by a worker of the streaming platform.

For a particular VM, both planned and unplanned maintenance activities may occur, and the hardware hosting the particular VM may fail too, all of the failure and maintenance activities reduces reliability of unicast video streaming that counts on reliability of the particular involved VMs in those public cloud computing environment. Thus, in a streaming platform, it is preferable for every worker receive an identical low-latency copy of every input packet to maximize video source availability. Without available IP multicast in the cloud computing environment, the streaming platform may build a component designed specifically to handle the high packet rate of unicast UDP streams and selectively forward copies of those packets at the line rate or near the line rate to the correct workers.

Figure 11:
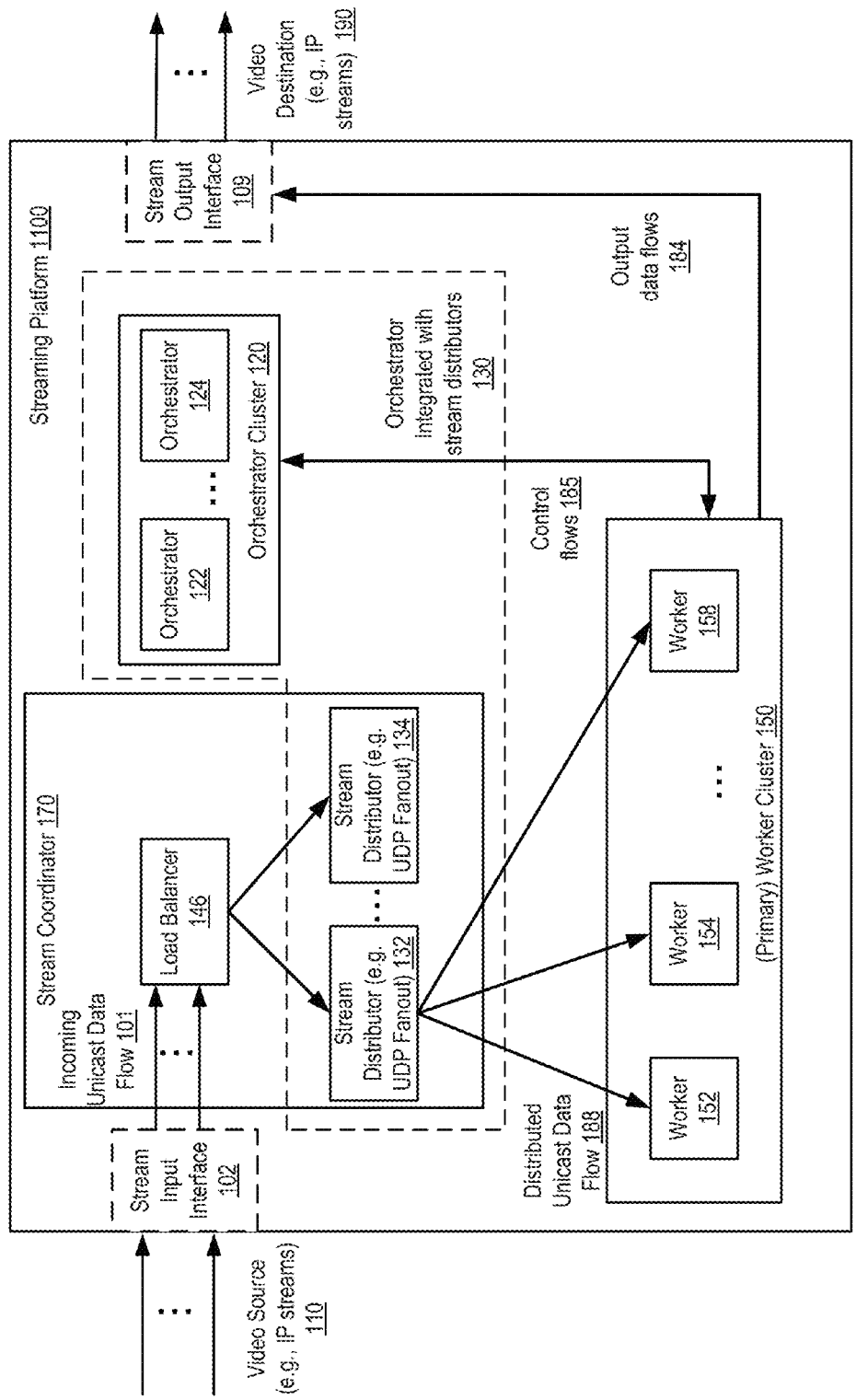
FIG. 11 illustrates a video streaming platform for unicast video in a cloud computing environment according to one embodiment of the invention.

FIG. 11 illustrates a video streaming platform for unicast video in a cloud computing environment according to one embodiment of the invention. Streaming platform 1100 is similar to streaming platform 100 of FIG. 1. The same or similar references indicate elements or components having the same or similar functionalities and elements or components not essential to the embodiment of the invention is omitted in FIG. 11.

The component built specifically to handle the high packet rate of unicast UDP streams is a set of stream distributors 132-134, which along with load balancer 146, is a part of stream coordinator 170 in one embodiment. Load balancer 146 is a common component of a cloud computing environment, and it is used to distribute workloads across multiple computing resources. Load balancing may aim at optimizing processing of incoming unicast data flow 101 using a variety of criteria, such as optimizing resource use, maximizing throughput, minimizing response time, and/or avoiding overload of resources.

In one embodiment, each packet of incoming unicast data flow 101 is sent to one of the set of stream distributors 132-134. The selection of a stream distributor is at least partially based on a hash value computed from the source IP: port and destination IP: port of the packet in one embodiment. Since one unicast data flow generally generates the same hash value, all packets of an incoming unicast flow goes through the same stream distributor. At the selected stream distributor, each packet is broadcasted to all workers 152-158 of primary worker cluster 150. Since the unicast UDP packets of incoming unicast data flow 101 are broadcasted to all the workers, sometimes a stream distributor is referred to as a UDP fanout.

In another embodiment, the packet is broadcasted to the subset of workers 152-158 which are running processing tasks for video source associated with the packets.

The set of stream distributors 132-134 may be software modules implemented in a VM of the hosting cloud computing environment of streaming platform 1100. The VM is implemented on a computing system such as a computer server (often referred to a host of the VM) in the cloud computing environment. The set of stream distributors 132-134 may be integrated to the electronic device serving as orchestrator cluster 120. The dotted box indicates orchestrator integrated with the stream distributors at reference 130.

With the stream distributors broadcasting UDP packets to a set of workers processing the video source, the input data to the task graph for each video source is consistently available on all workers executing processing tasks for that video source. That allows for both (1) a partial layer failure where one of a number of workers executing processing tasks according to the task graph dies, and (2) rapid restart/connection on a new worker executing processing tasks during startup and reconnect/failure handling. A stream distributor may also add functionalities to provide dual network paths for the input unicast data flows, to handle time-shifted input unicast data flows, and to provide error correction and packet reconstruction to the unicast data flows.

Given the expectation that in a cloud computing environment that workers and VMs hosting the workers may be taken offline abruptly for maintenance frequently and the significant impact on the stream processing when source data is unavailable, streaming platform 1100 should be designed for this kind of case happening and still maintaining aggressive availability target of the streaming platform (e.g., 99.99% per month SLA). Given the importance of the stream distributors, it is vital to ensure availability of the stream distributors upon maintenance and failure associated with the hosting cloud computing environment of the streaming platform.

Figure 12:
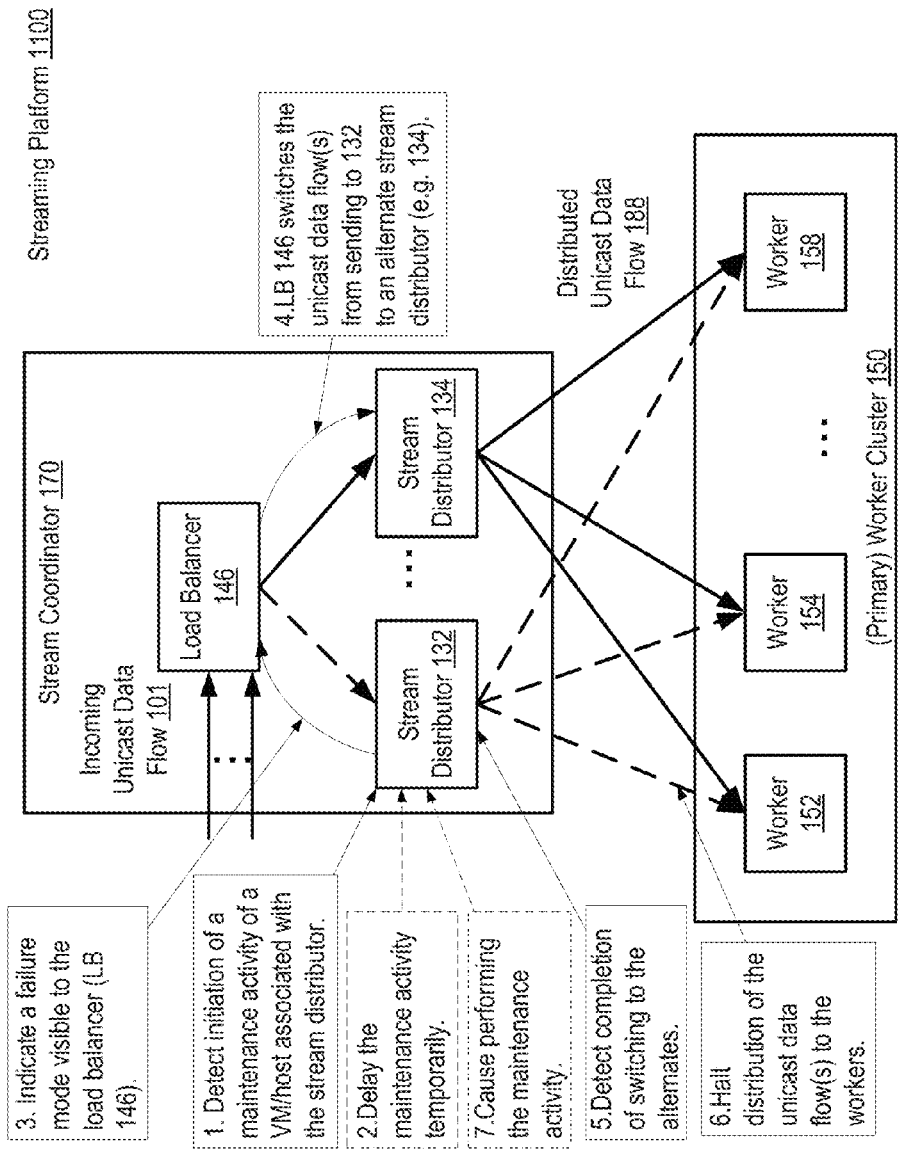
FIG. 12 illustrates interaction of a load balancer and a set of stream distributors according to one embodiment of the invention.

FIG. 12 illustrates interaction of a load balancer and a set of stream distributors according to one embodiment of the invention. The streaming platform 1100 is the same as the one of FIG. 11. The same or similar references indicate elements or components having the same or similar functionalities and elements or components not essential to the embodiment of the invention is omitted in FIG. 12. Task boxes 1 to 7 illustrate the order in which operations are performed according to one embodiment of the invention.

At task box 1, stream distributor 132 detects initiation of a maintenance activity on a VM or its host associated with the stream distributor. The maintenance activity may be as planned such as a VM entering a maintenance mode, or unplanned such as VM restarts due to update of the cloud computing environment, or hardware failure/degrade of the VM host computer server. The detection of the stream distributor may be based on receiving a notification (e.g., through a callback API) from the VM or its host.

Optionally at task box 2, stream distributor 132 delays the maintenance activity for a period of time after detecting the initiation. The delay may be through interactions between stream distributor 132 and the cloud computing environment. For example, stream distributor 132 may postpone acknowledgement to the notification from the VM or its host. The period of time is a short period that is sufficient to allow load balancer 146 to switch one or more unicast data flows being sent to stream distributor 132 over to an alternate stream distributor (e.g., 5~15 seconds). The short period may be predetermined by the operator of streaming platform 1100 in one embodiment. In an alternative embodiment, the short period ends when stream distributor 132 no longer receives UDP packets of the one or more unicast data flows.

At task box 3, stream distributor 132 indicates a failure mode visible to load balancer 146. In one embodiment, stream distributor 132 sends a failure mode notification to load balancer 146. In an alternative embodiment, load balancer 146 sends out periodic probes to the stream distributors and finds that stream distributor 132 is in a failure mode. The periodic probe may be a hypertext transfer protocol (HTTP) health check call to the stream distributor. The stream distributor in the failure mode responds with a failure code instead of a success code (e.g. HTTP status code 200).

At task box 4, load balancer 146 switches the one or more unicast data flows being sent to stream distributor 132 over to an alternate stream distributor such as stream distributor 134. A stream distributor often broadcasts many data flows simultaneously and once the stream distributor enters a failure mode, the data flows need to be supported by other stream distributors. The reallocation of the data flows to the other stream distributors may use techniques known in the art. The data flows are not necessarily or even likely reallocated to a single stream distributor, but rather to multiple stream distributors. Thus, stream distributor 134 is only an example of one of multiple alternate stream distributors to stream distributor 132 when stream distributor 132 broadcasts more than one unicast data flows.

At task box 5, stream distributor 132 detects completion of the switch of the one or more unicast data flows by load balancer 146. The detection may be based on that stream distributor 132 no longer receives UDP packets of the one or more unicast data flows from load balancer 146 in one embodiment. In an alternative embodiment, stream distributor 132 may utilize a switch completion indication of load balancer 146 to make the detection.

At task box 6, stream distributor 132 halts distribution of the one or more unicast data flows to the workers. As the one or more unicast data flows have now switched to alternate stream distributor(s), which starts forwarding UDP packets of the flows to the workers, stream distributor 132 stops forwarding UDP packets of the flows.

At task box 7, stream distributor 132 optionally causes performance of the maintenance activity on the VM or the host associated with the stream distributor. The delay at task box 2 temporarily prevents the maintenance activity of the VM/host associated with stream distributor 132 from happening, and now that the unicast data flows is switched off from stream distributor 132, the maintenance activity may proceed. In one embodiment, stream distributor 132 sends an acknowledgement to the notification of initiation of the maintenance activity to cause the performance.

Through the illustrated operations, the maintenance activity will have a minimal impact to the unicast data originally flowing through stream distributor 132 to workers 152-158 as the unicast data flows will flow through alternate stream distributors such as stream distributor 134.

Figure 13:
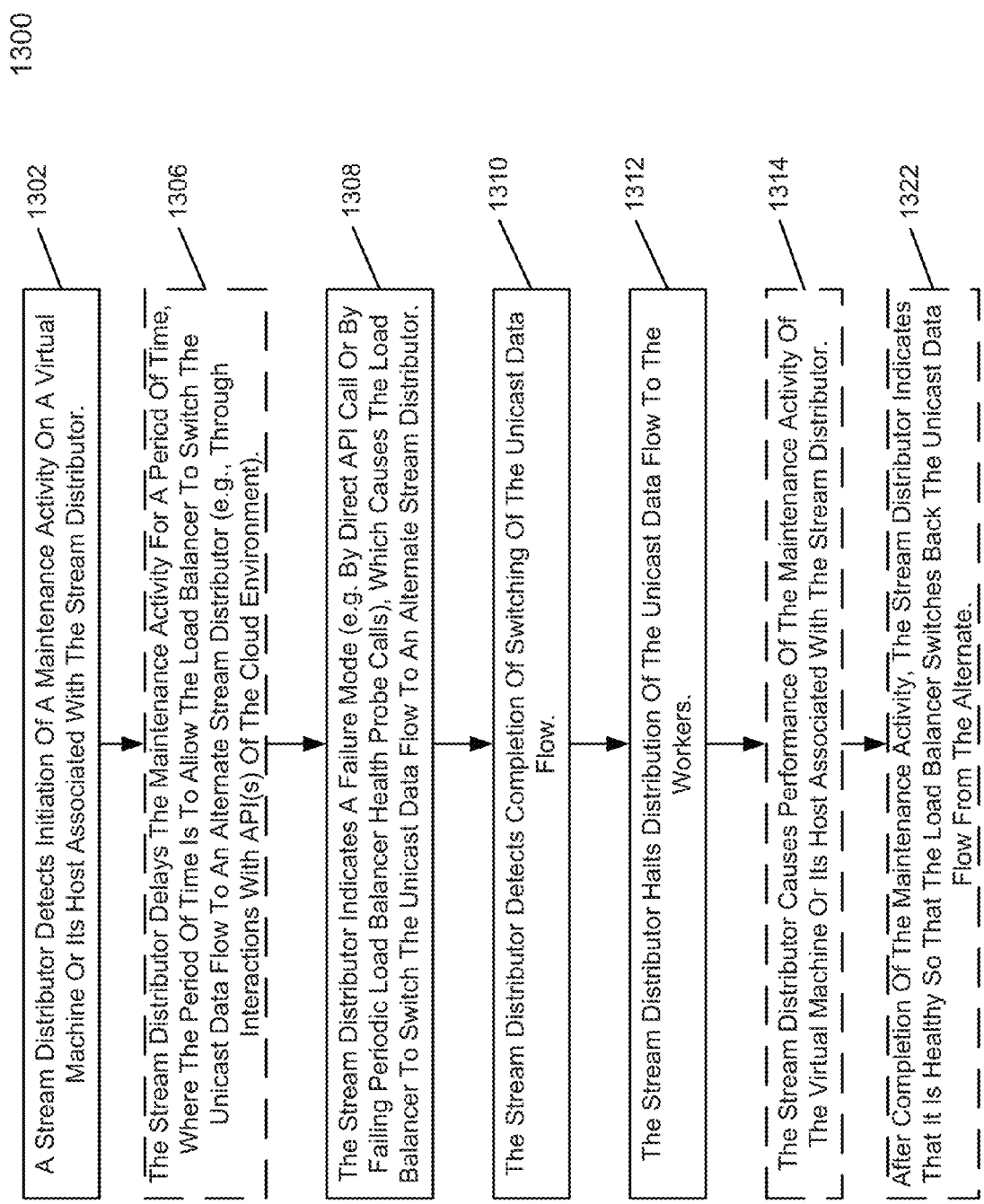
FIG. 13 is a flow diagram illustrating operations on a stream distributor of a streaming platform in a cloud computing environment upon detecting initiation of a maintenance activity according to one embodiment of the invention.

FIG. 13 is a flow diagram illustrating operations on a stream distributor of a streaming platform in a cloud computing environment upon detecting initiation of a maintenance activity according to one embodiment of the invention. Method 1300 may be performed on a stream distributor such as stream distributor 132 of FIG. 12.

At reference 1302, the stream distributor detects initiation of a maintenance activity (e.g., halting operations or reboot) on a VM or its host associated with the stream distributor, the VM is a part of a cloud computing environment of the streaming platform system. The host is a computing device of the cloud computing environment hosting the VM. The detection is based on receiving a notification of the maintenance activity in one embodiment.

Optionally, the stream distributor delays the maintenance activity for a period of time after detecting the initiation at reference 1306. The period of time is to allow the load balancer to switch each of the one or more unicast data flows currently going through the stream distributor to an alternate stream distributor. The period of time is predetermined in one embodiment. In an alternative embodiment, the period of time ends upon the stream distributor no longer receiving UDP packets of the one or more unicast data flows from the load balancer. In one embodiment, delaying the maintenance activity includes postponing acknowledgement of a notification of the initiation of the maintenance activity through interactions with API of the cloud computing environment hosting the streaming platform.

At reference 1308, the stream distributor indicates a failure mode, where the failure mode indication is to cause the load balancer to switch each of the one or more unicast data flows currently going through the stream distributor to an alternate stream distributor. In one embodiment, the load balancer probes the stream distributor at a predetermined interval to determine whether or not the stream distributor is in the failure mode. Once the load balancer determines that the stream distributor is in the failure mode, the load balancer switches each of the one or more unicast data flows currently going through the stream distributor to an alternate stream distributor.

At reference 1310, the stream distributor detects completion of switch of each of the one or more unicast data flows to an alternate stream distributor. In one embodiment, the stream distributor detects the completion based on that the stream distributor no longer receives the UDP packets of the one or more unicast data flows from the load balancer. In an alternative embodiment, stream distributor 132 utilizes a switch completion indication of the load balancer to make the detection. At reference 1312, the stream distributor halts distribution of each of the one or more unicast data flows to the workers it used to broadcast to.

At reference 1314, the stream distributor optionally causes performance of the maintenance activity of the VM or its hosts associated with the stream distributor. In one embodiment, stream distributor sends an acknowledgement to the notification of initiation of the maintenance activity to cause the performance. The cloud computing environment then performs the maintenance activity.

After the maintenance activity is complete, the stream distributor optionally indicates that it is healthy again so that the load balancer switches each of the one or more switched away unicast data flows back to the stream distributor at reference 1322. The timing of the switch back is implementation dependent. Since workers receive the UDP packets of the incoming data flows during the switch over and the switch back, the timing does not have significant impact on the workers or their processing tasks.

In the embodiments of the invention described so far, all the UDP packets and their entire payloads of the unicast data flows are forwarded to all the workers of the primary worker cluster (or to the subset of workers performing processing tasks for each video source). Yet, for some video source processing, only a subset of the data flows is needed, and one such a data flow is often called a multiple program transport stream (MPTS). For example, a streaming platform may extract only 10~20 Megabits/sec of data out of a work flow for a MPTS video source of 50~100 Megabits/sec for use when processing the work flow.

If the number of workers in the primary worker cluster is fairly large and the MPTS video source requires a high bandwidth, processing all the UDP packets at the stream distributor may waste network bandwidth at the stream distributor and risk introducing UDP packet loss in transmitting to the stream coordinator, processing in the stream coordinator, and receiving at the workers. Thus the stream coordinator may perform logical filtering of the desired UDP packets out of the overall data flow, and only forwarding a portion of the data flow of the incoming video source for processing by the workers. The selection of the portion of the data flow is based at least partially on processing tasks executed by the workers.

Electronic Devices Implementing Embodiments of the Invention

Figure 14:
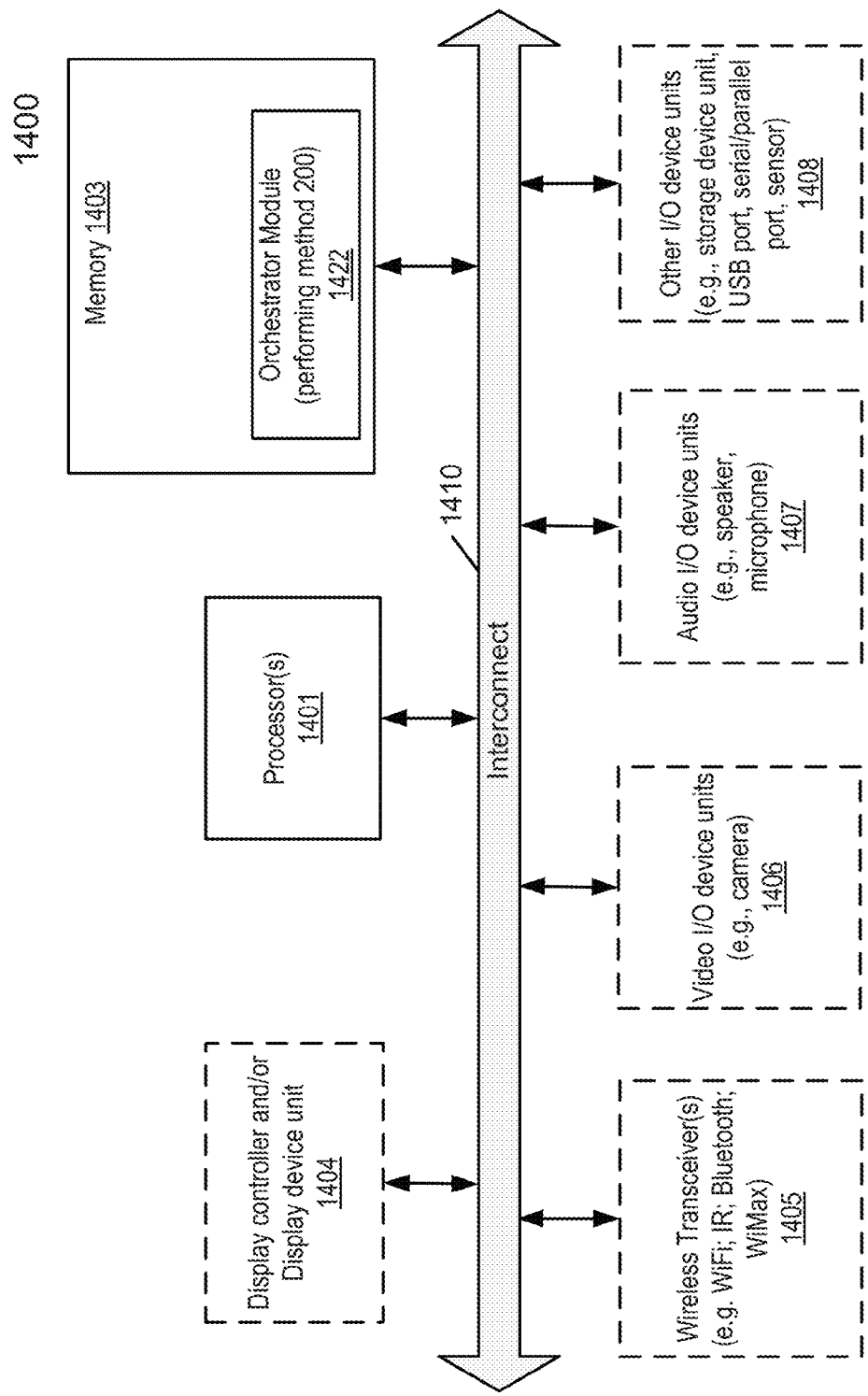
FIG. 14 is a block diagram illustrating an electronic device that may serve as an orchestrator of a streaming platform in a cloud computing environment according to one embodiment of the invention.

FIG. 14 is a block diagram illustrating an electronic device that may serve as an orchestrator of a streaming platform in a cloud computing environment according to one embodiment of the invention. The electronic device may be a computing device (e.g., a computer server) of a cloud computing environment). System 1400 may represent any of the orchestrator described above performing any of the processes or methods described above. System 1400 can include many different components. These components can be implemented as integrated circuits (ICs), portions thereof, discrete electronic devices, or other modules adapted to a circuit board such as a motherboard or add-in card of a computing system, or as components otherwise incorporated within a chassis of the computing system. Note also that system 1400 is intended to show a high level view of many components of the computing system. However, it is to be understood that additional components may be present in certain implementations and furthermore, different arrangement of the components shown may occur in other implementations.

In one embodiment, system 1400 includes processor 1401, memory 1403, and optionally device units 1404-1408 that are interconnected via a bus or an interconnect 1410. Processor 1401 may represent a single processor or multiple processors with a single processor core or multiple processor cores included therein. Processor 1401 may represent one or more general-purpose processors such as a microprocessor, a central processing unit (CPU), or processing device. More particularly, processor 1401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1401 may communicate with memory 1403, which in an embodiment can be implemented via multiple memory devices to provide for a given amount of system memory. Memory 1403 may include one or more volatile storage (or memory) devices such as random access memory (RAM), dynamic RAM (DRAM), synchronous DRAM (SDRAM), static RAM (SRAM), or other types of storage devices. Memory 1403 may store information including sequences of instructions that are executed by processor 1401, or any other device units. For example, executable code and/or data of a variety of operating systems, device drivers, firmware (e.g., input output basic system or BIOS), and/or applications can be loaded in memory 1403 and executed by processor 1401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Memory 1403 contains operator module 1422, which may perform operations of an orchestrator in a discussed herein above in relating to method 200.

System 1400 may optionally further include I/O devices such as device units 1404-1408, including display control and/or display device unit 1404, wireless transceiver(s) 1405, video I/O device unit(s) 1406, audio I/O device unit(s) 1407, and other I/O device units 1408 as illustrated. Wireless transceiver 1405 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. System 1400 may also include an ultrasound device unit (not shown) for transmitting a conference session code.

Video I/O device unit 1406 may include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips and conferencing. Audio I/O device unit 1407 may include a speaker and/or a microphone to facilitate voice-enabled functions, such as voice recognition, voice replication, digital recording, and/or telephony functions. Other optional devices 1408 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional device units 1408 may further include certain sensors coupled to interconnect 1410 via a sensor hub (not shown), while other devices such as a keyboard or thermal sensor may be controlled by an embedded controller (not shown), dependent upon the specific configuration or design of system 1400.

System 1400 may be coupled to a streaming platform such as streaming platforms 100 and 1100, and the streaming platform may be coupled to a stream coordinator, one or more worker cluster (working and/or backup), all discussed herein (e.g., in discussion relating to FIGS. 1, 7, and 9). System 1400 may perform methods discussed herein above relating to FIGS. 2-4 and 5-10.

Note that while system 1400 is illustrated with various components, it is not intended to represent any particular architecture or manner of interconnecting the components; as such details are not germane to embodiments of the present invention. It will also be appreciated that an electronic device having fewer components or perhaps more components may also be used with embodiments of the invention.

Figure 15:
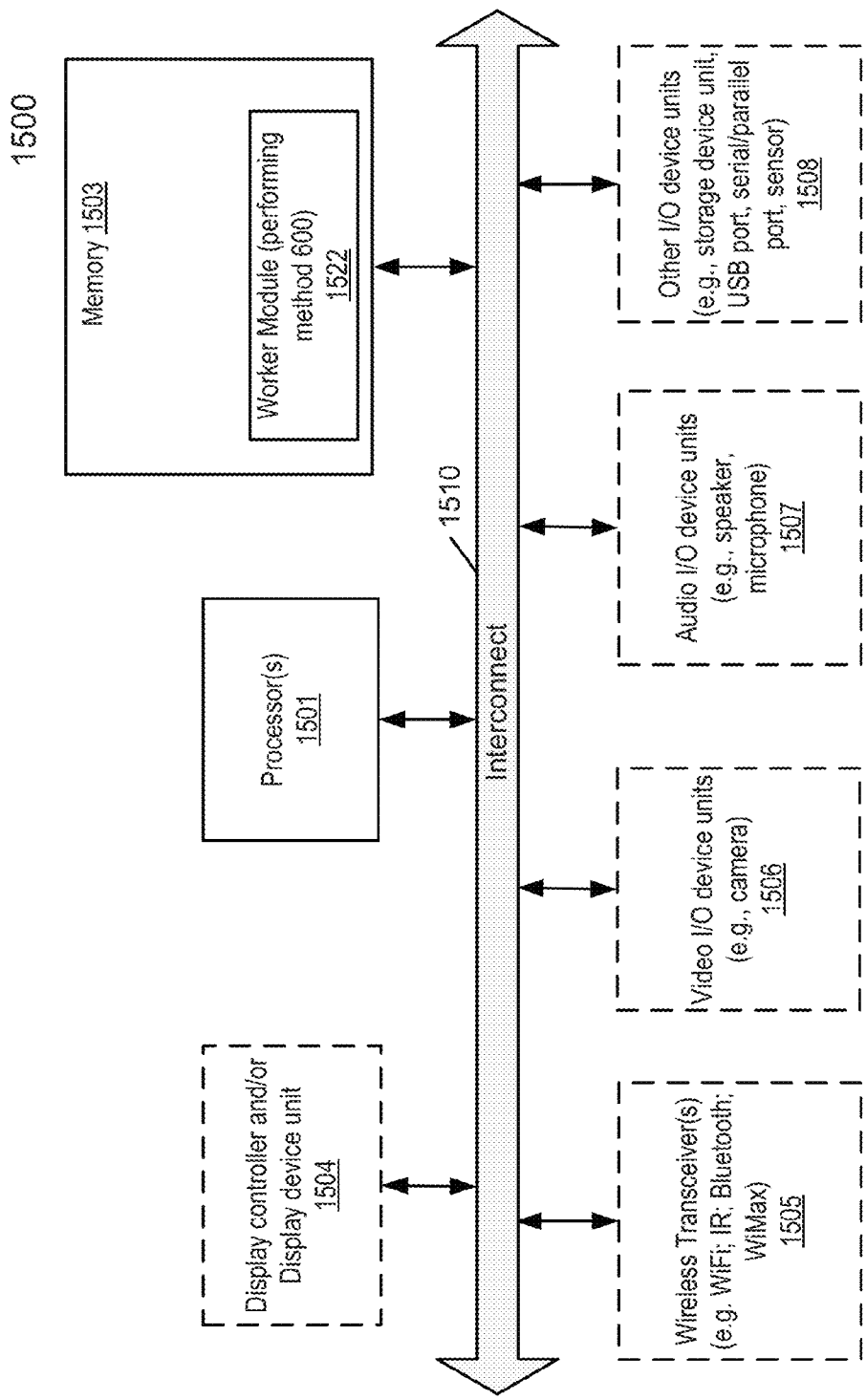
FIG. 15 is a block diagram illustrating an electronic device that may serve as a worker of a streaming platform in a cloud computing environment according to one embodiment of the invention.

FIG. 15 is a block diagram illustrating an electronic device that may serve as a worker of a streaming platform in a cloud computing environment according to one embodiment of the invention. FIG. 15 is similar to FIG. 14, and the same or similar references indicate elements or components having the same or similar functionalities. One difference is that Memory 1503 contains worker module 1522, which may perform operations of a worker discussed herein above in relating to method 600, which may include methods 800 and 1000.

Figure 16:
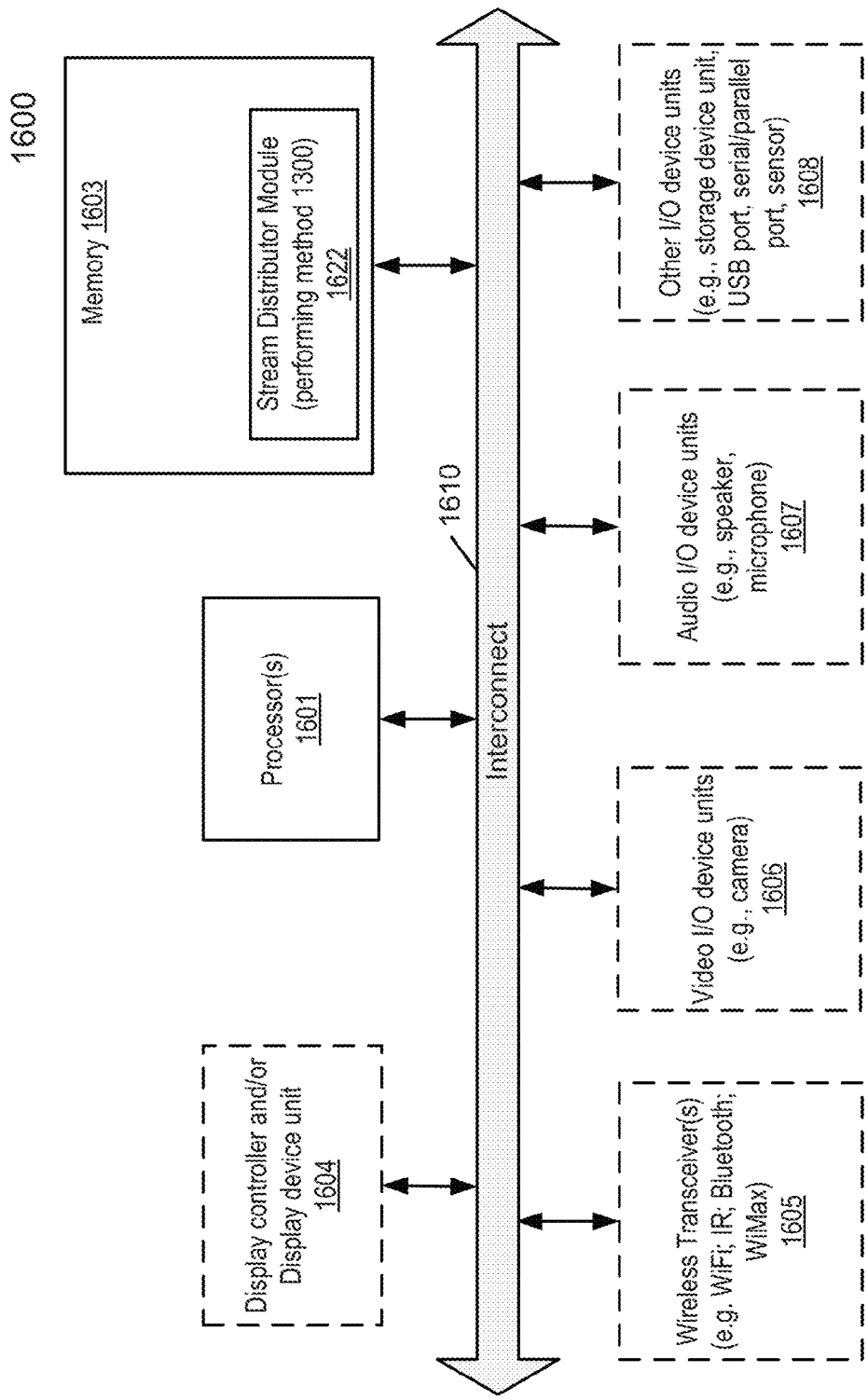
FIG. 16 is a block diagram illustrating an electronic device that may serve as a stream distributor of a streaming platform in a cloud computing environment according to one embodiment of the invention.

FIG. 16 is a block diagram illustrating an electronic device that may serve as a stream distributor of a streaming platform in a cloud computing environment according to one embodiment of the invention. FIG. 16 is similar to FIG. 14, and the same or similar references indicate elements or components having the same or similar functionalities. One difference is that Memory 1603 contains stream distributor module 1622, which may perform operations of a worker discussed herein above in relating to method 1300.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

Note the operations of the flow diagrams in FIGS. 2, 6, 8, 10, and 13 are described with reference to the exemplary embodiment electronic devices of FIGS. 14-16. However, it should be understood that the operations of flow diagrams can be performed by embodiments of the invention other than those discussed with reference to FIGS. 14-16, and the embodiments discussed with reference to FIG. 14-16 can perform operations different than those discussed with reference to the flow diagrams of FIGS. 2, 6, 8, 10, and 13.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in an electronic device serving as an orchestrator managing video and audio stream processing of a streaming platform system, the method comprising:

receiving a request to process a video source, the request containing parameters describing the video source;

creating a task graph based on the request, wherein the task graph is a directed acyclic graph of tasks for processing the video source, wherein each node of the task graph represents a processing task, and wherein each edge of the task graph represents a data flow across two processing tasks and corresponding input and output of each processing task;

estimating resource requirements of each processing task, where estimating the resource requirement includes any one of estimating storage usage of each processing task during its execution cycle, estimating communication bandwidth usage of each processing task during its execution cycle, or estimating computing resource consumption of each processing task during its execution cycle; and splitting the task graph into a plurality of subsets, wherein each subset corresponds to a task group to be executed by one or more workers of a plurality of workers, where each worker is a processing unit of the streaming platform system.

2. The method of claim 1, the method further comprising:
after estimating the resource requirement of each processing task, revising the task graph prior to splitting the task graph into the plurality of subsets based on at least one of:
the estimated resource requirement of one or more processing tasks; and
redundancy requirements of one or more processing tasks.

3. The method of claim 2, the method further comprising:
after revising the task graph and after splitting the task graph into the plurality of subsets, estimating the resource requirement of each processing task again to accommodate any change as of resource requirement as a result of the revision.

4. The method of claim 1, the method further comprising:
storing a status of each subset of the task graph; and
updating the status of each subset when the subset is allocated to one or more workers for execution.

5. The method of claim 1, wherein the parameters describing the video source include at least one of:
a type of the video source;
an address of the video source;
an indication of whether to enable caption or enable advertisement insertion process;
desired video and audio transcoding operations by the streaming platform system;
desired content protection operations by the streaming platform system; and
desired publishing operations to output from the streaming platform system.

6. The method of claim 1, wherein estimating communication bandwidth usage and computing resource consumption of each processing task include predictions based on the video resource being ingested in the streaming platform system.

7. The method of claim 1, wherein each subset corresponds to a task group to be executed by a single worker of a plurality of workers, and wherein the task graph contains a single input task.

8. An electronic device to serve as an orchestrator managing video and audio streams of a streaming platform system, the electronic device comprising:
a non-transitory machine-readable storage medium to store the orchestrator; and
a processor coupled to the non-transitory machine-readable storage medium, the processor to execute the orchestrator, the orchestrator configured to receive a request to process a video source, the request containing parameters describing the video source, create a task graph based on the request, wherein the task graph is a directed acyclic graph of tasks for processing the video source, wherein each node of the task graph represents a processing task, and wherein each edge of the task graph represents a data flow across two processing tasks and corresponding input and output of each processing task, estimate resource requirements of each processing task, where the estimate of the resource requirements include any one of an estimate of storage usage of each processing task during its execution cycle, an estimate of communication bandwidth usage of each processing task during its execution cycle, or an estimate of computing resource consumption of each processing task during its execution cycle, and split the task graph into a plurality of subsets, wherein each subset corresponds to a task group to be executed by one or more workers of a plurality of workers, where each worker is a processing unit of the streaming platform system.

9. The electronic device of claim 8, wherein the orchestrator is further configured to:
after estimating the resource requirement of each processing task, revise the task graph prior to splitting the task graph into the plurality of subsets based on at least one of:
the estimated resource requirement of one or more processing tasks; and
redundancy requirements of one or more processing tasks.

10. The electronic device of claim 8, wherein the orchestrator is further configured to:
store a status of each subset of the task graph; and
update the status of each subset when the subset is allocated to one or more workers for execution.

11. The electronic device of claim 8, wherein the parameters describing the video source include at least one of:
a type of the video source;
an address of the video source;
an indication of whether to enable caption or enable advertisement insertion process;
desired video and audio transcoding operations by the streaming platform system;
desired content protection operations by the streaming platform system; and
desired publishing operations to output from the streaming platform system.

12. The electronic device of claim 8, wherein each subset corresponds to a task group to be executed by a single worker of a plurality of workers, and wherein the task graph contains a single input task.

13. A non-transitory machine-readable medium having instructions stored therein, which when executed by a processor, cause the processor to perform operations in an electronic device serving as an orchestrator managing video and audio stream processing of a streaming platform system, the operations comprising:
receiving a request to process a video source, the request containing parameters describing the video source;
creating a task graph based on the request, wherein the task graph is a directed acyclic graph of tasks for processing the video source, wherein each node of the task graph represents a processing task, and wherein each edge of the task graph represents a data flow across two processing tasks and corresponding input and output of each processing task;
estimating resource requirements of each processing task, where estimating the resource requirements include any one of estimating storage usage of each processing task during its execution cycle, estimating communication bandwidth usage of each processing task during its execution cycle, or estimating computing resource consumption of each processing task during its execution cycle; and splitting the task graph into a plurality of subsets, wherein each subset corresponds to a task group to be executed by one or more workers of a plurality of workers, where each worker is a processing unit of the streaming platform system.

14. The non-transitory machine-readable medium of claim 13, the operations further comprising:
after estimating the resource requirement of each processing task, revising the task graph prior to splitting the task graph into the plurality of subsets based on at least one of:
the estimated resource requirement of one or more processing tasks; and
redundancy requirements of one or more processing tasks.

15. The non-transitory machine-readable medium of claim 13, the operations further comprising:
storing a status of each subset of the task graph; and
updating the status of each subset when the subset is allocated to one or more workers for execution.

16. The non-transitory machine-readable medium of claim 13, the operations further comprising:
a type of the video source;
an address of the video source;
an indication of whether to enable caption or enable advertisement insertion process;
desired video and audio transcoding operations by the streaming platform system;
desired content protection operations by the streaming platform system; and
desired publishing operations to output from the streaming platform system.

17. The non-transitory machine-readable medium of claim 13, wherein each subset corresponds to a task group to be executed by a single worker of a plurality of workers, and wherein the task graph contains a single input task.

* * * * *